United States Patent
Coyne

(10) Patent No.: US 8,125,482 B2
(45) Date of Patent: Feb. 28, 2012

(54) GRAPHICAL USER INTERFACE GRAPHICS-BASED INTERPOLATED ANIMATION PERFORMANCE

(75) Inventor: Robert E. Coyne, Montclair, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 850 days.

(21) Appl. No.: 12/122,147

(22) Filed: May 16, 2008

(65) Prior Publication Data

US 2008/0222555 A1    Sep. 11, 2008

Related U.S. Application Data

(63) Continuation of application No. 09/672,475, filed on Sep. 28, 2000, now Pat. No. 7,391,420.

(51) Int. Cl.
*G06T 15/00* (2011.01)
(52) U.S. Cl. ......... 345/419; 345/426; 345/473; 345/629
(58) Field of Classification Search .................. 345/418, 345/426, 473, 474, 475, 419, 629
See application file for complete search history.

(56) References Cited

U.S. PATENT DOCUMENTS

| | | |
|---|---|---|
| 5,847,708 A | 12/1998 | Wolff |
| 5,854,634 A | 12/1998 | Kroitor |
| 5,933,150 A | 8/1999 | Ngo et al. |
| 6,011,562 A | 1/2000 | Gagne et al. |
| 6,720,962 B1 | 4/2004 | Alter |
| 7,233,327 B2 * | 6/2007 | Isner .............................. 345/419 |
| 7,391,420 B1 | 6/2008 | Coyne |

OTHER PUBLICATIONS

Fishwick, P. A. et al.: "Using Discrete Event Modeling for Effective Computer Animation Control"; Simulation Conference, 1991; Proceedings, Winter, Phoenix, AZ, USA Dec. 8-11, 1991; New York, NY, USA, IEEE, US, Dec. 8, 1991 pp. 1156-1164, XP010052843; ISBN: 0-7803-0181-1; p. 1160, right-hand column, paragraph 4.3—p. 1162, left-hand column, paragraph 4.4; figures 4-8.

* cited by examiner

*Primary Examiner* — Phu Nguyen

(57) ABSTRACT

An arrangement provides for displaying an object, such as a drawn object, or a database search result, based on a graphical user interface. A first display window is provided for specifying attributes of an object. A second window is provided for spatially inserting anchors for the object, where each anchor specifies a desired characteristic of the object, such as a pose of a face. A third window is provided for the desired object display. The anchors are placed in the second window with the aid of a controlled cursor. Placement of the cursor in the second window also controls the displayed object in the third window, which is developed based on the placement of the cursor in the second window relative to the anchors.

12 Claims, 26 Drawing Sheets

COMPUTER-READABLE MEDIUM HAVING COMPUTER-EXECUTABLE INSTRUCTIONS/METHOD HAVING STEPS WHEREIN SAID INSTRUCTIONS/STEPS INCLUDE:

2504

DRAGGING A POINTER OVER A TWO/THREE DIMENSIONAL ARRANGEMENT OF A PLURALITY OF TARGET POINTS/ANCHORS/NODE TERMS IN A TARGET/CONTROLLER WINDOW WHEREIN EACH TARGET/ANCHOR/NODE TERM REPRESENTS A DISPLACEMENT OF A STATE OF AN OBJECT FROM A BASE STATE

2506

REDRAWING/UPDATING THE BASE STATE OF THE OBJECT IN A DISPLAY WINDOW IN ACCORDANCE WITH THE PROXIMITY OF THE POINTER TO THE TARGET POINTS/ANCHORS/NODE TERMS AS THE POINTER IS DRAGGED OVER THE TARGET WINDOW

FIG. 26C

Web search result  8,887,816 matches Next 10 >  | Hide summaries | Sort by date | Ungroup results 1. DEEP-ECOLOGY mar97 discussion::Eco-Psychology & Activism: Knowing the Land We Live On
For the last couple of years the Earth Trust Foundation has been bring local activists together with national thinkers for retreats to deepen our work, strengthen...
Relevance: 100% Date:21 Mar 1997, Size 6.6K, http://csf.colorado.edu/mail/deep-ecology/mar97/0076.html
find similar pages | translate this page 22.GIVING THE AMERICAN PSYCHOLOGICAL FOUNDATION
Description of the types of giving to the American Psychological Foundation.
Relevance: 100% Date 15 Apr 1999, Size 7.5K, http://www.apa.org/apf/giving.html
find similar pages | translate this page 3.Healthcare Psychology Research Group
Current Work Facilities and opportunities Future plans Integration of research Current work Current work in reproductive health and well-being includes: an NHS R&D-funded collaboration with the medical....
Relevance: 100% Date: 12 Sep 1999, Size 6.3K
http://www.psyc.leeds.ac.uk/research/hlth/interests.html
find similar pages | translate this page

GRAPHICAL USER INTERFACE GRAPHICS-BASED INTERPOLATED ANIMATION PERFORMANCE

PRIORITY

The present application is a continuation of U.S. patent application Ser. No. 09/672,475, filed Sep. 28, 2000, the content of which is incorporated herein by reference in its entirety.

RELATED FILING

The present application is related to a patent application being filed concurrently entitled Graphical User Interface Text-based Interpolation Searching, by Robert Coyne and Steven Greenspan.

FIELD OF THE INVENTION

The present invention relates generally to devices for computer animation performance and methods and computer-readable media for implementing the same. More particularly, the present invention relates to using an interactive graphical interface for animation performance.

BACKGROUND OF THE INVENTION

Computer systems often utilize displays with icons, pictures, text, pop-up, drop-down menus and other graphical items. In these systems, individual graphical items or combinations of graphical items are typically shown on the display monitor. The graphical item is generally activated by a point and click method in which a cursor controlled by a mouse, touch device, pen or trackball is pointed at the item, and a button, keyboard command or activation unit is clicked.

Generally, three dimensional character animations are incrementally specified using highly technical interfaces wherein the user adjusts one parameter at a time and then previews the result. The final animation is an immutable sequence of rendered frames. At the other end of the spectrum of animation are video games wherein the user, in real-time, triggers predefined movements, but is given very little control over the nuances of expression and movement.

Generally, in many graphics implementations, animation may be performed in three dimensions, but typically utilizes a complex process called "rendering" to provide a representation of an image. For example, physical objects such as tubes, spheres, rectangles, and the like may be used to "build" other, more visually complex objects. Such objects may be rotated, stretched, twisted, or the like. However, such modeling generally requires utilizing modifiers, which may include a stack of parametric definitions for each desired geometric subclass, thus requiring a large amount of storage and a complex retrieval system.

Various three dimensional animation systems provide additive displacements as a method of combining partially defined gestures, facial expressions, or morphing targets. Such targets are generally controlled by bands of sliders.

Other related interfaces are the joystick music synthesizers, wherein the joystick is used to control various aspects of the timbre and dynamics of the sound. The joystick is moved from a first position to a second position, and the parameters are dynamically mixed based on the second position of the joystick.

In addition to automation, more generally, searches in databases are achieved by using key words or expressions so that an ordered list may be obtained. However, often the list is quite long, and thus is difficult to sort through to obtain the desired information.

Thus, there is a need for a device and method for a simplified graphical user interface that the user may utilize in an interactive fashion to provide relevance weightings for searches to facilitate re-ordering of search data and to add nuances of expression and movement in animation.

SUMMARY OF THE INVENTION

The present invention provides an electronic display system that facilitates the use of a graphical interface for interactive animation on a display device. The invention includes: a central processing unit; a memory loaded with an operating system, application programs and computer-executable instructions for using a graphical interface for achieving the animation; a display unit coupled to the system bus; a cursor control unit arranged to provide signals to control movement of a cursor on the display unit; and the system bus. The computer-executable instructions for achieving use of a graphical interface for animation include: (1) inserting a desired image onto a first window; (2) inserting anchors onto a second window by, for each anchor, selecting a desired pose from a plurality of predetermined poses; and (2) upon a cursor being dragged over the second window to a desired anchor, additively applying, for the desired anchor to the desired image based on a proximity of the cursor to the desired anchor. The characteristics for the anchors are, for animation, typically facial expressions, character poses or camera positions, and the like. The electronic display system is generally implemented as a computer display system. Inserting anchors may include combining a plurality of desired anchors to form a compound anchor, e.g., by dragging one or more anchors on top of another anchor. A palette may be shown in a third window on the display unit and may be used for selecting a desired image to be inserted onto the first window.

The present invention includes a method for facilitating use of an interactive graphical interface for animation on an electronic display system by a user. The steps of the method may include inserting a desired image onto a first window; inserting anchors onto a second window by, for each anchor, selecting a desired pose, from a plurality of preselected poses; and dragging a cursor over the second window to a desired anchor wherein characteristics for the desired anchor are additively applied to the desired image, based on a proximity of the cursor to the desired anchor. Characteristics for the anchors in the method are typically, for animation: facial expressions, character poses, orientation of an image or camera positions and the like. The electronic display system may be implemented by a computer display system. A plurality of desired anchors may be combined to form a compound anchor by dragging an anchor onto another anchor or pile of anchors. Where desired, a palette in a third window displayed on the display unit may be used for selecting a desired image to be inserted onto the first window.

Where desired, the steps of the method of the invention may be implemented by computer-executable instructions in a computer-readable medium.

BRIEF DESCRIPTION OF THE DRAWINGS

The accompanying drawings, which are incorporated into and form a part of the specification, illustrate preferred embodiments of the present invention and, together with the description, serve to explain the principles of the invention. The drawings are only for the purpose of illustrating a preferred embodiment of the invention and are not to be construed as limiting the invention. In the drawings, like numbers refer to like parts throughout and mouse clicking for a cursor is shown by a circle:

FIG. 25 shows one embodiment of steps for a method or computer-readable medium having computer-executable instructions for facilitating animation using a graphics-based graphical user interface in accordance with the present invention.

FIGS. 26A-26C illustrate one embodiment of a graphic user interface in accordance with the present invention.

DESCRIPTION OF THE PREFERRED EMBODIMENTS

Figure 1:
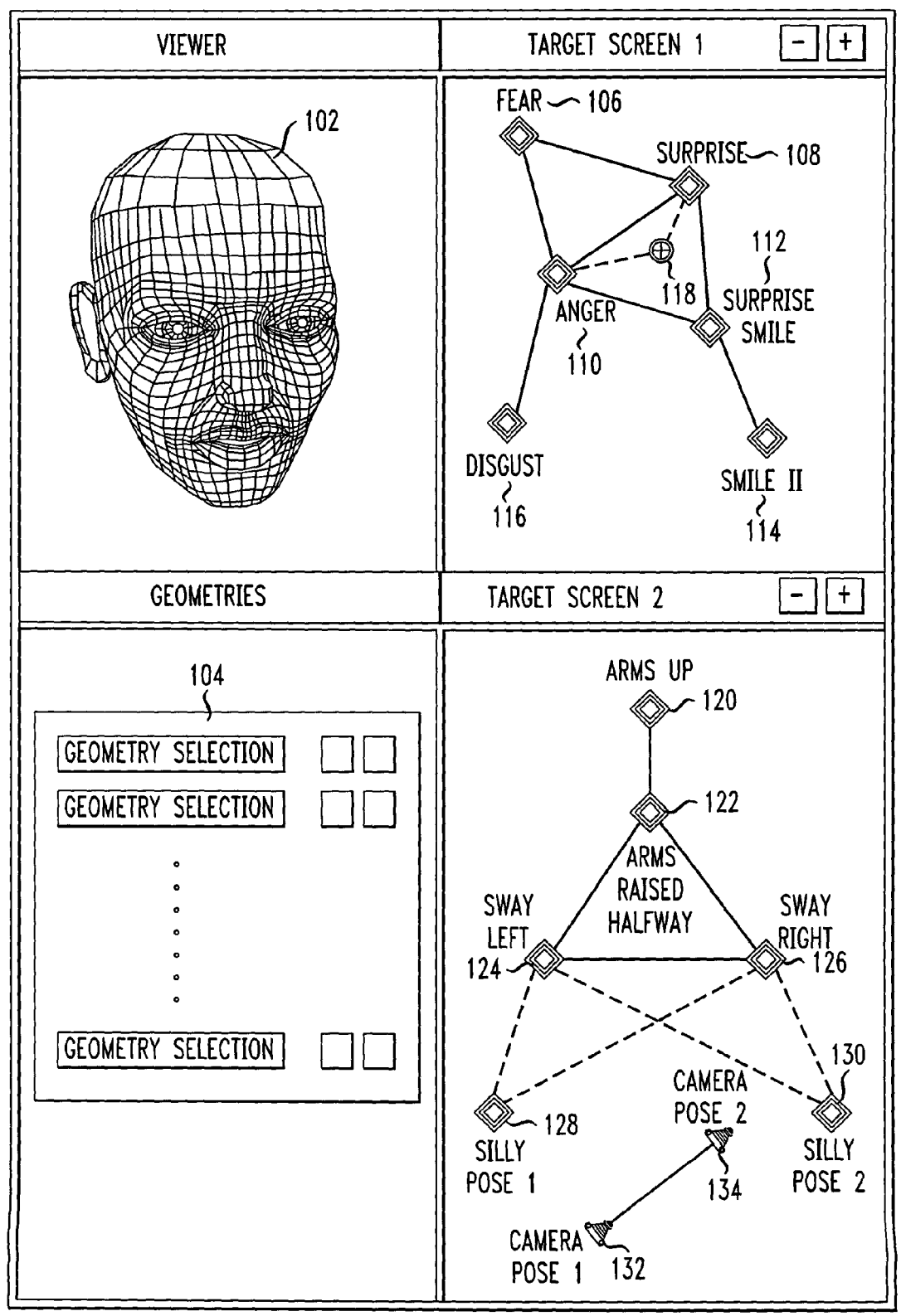
FIG. 1 is a graphical representation of a 4-way split screen depiction of one embodiment of an implementation scheme for using a graphical interface for animation in accordance with the present invention.

The present invention provides a graphical user interface which allows the user to interactively change the state of an object or objects. The interface is controlled by a pointing device (mouse or tablet) or any other input device whose output may be translated to an x,y position on a second window.

In automation: The visual changes of the object that occur as the pointer is moved create an animation sequence. Since the user may see the resulting change of the object in real-time as the pointer moves, the process of creating the animation becomes a truly interactive performance. This is much different than the more step-by-step procedures used in traditional animation interfaces.

In a search: The interface of the present invention may also be used interactively to search to find a desired state of the object. Since the user may see the resulting change of the object as he moves the pointer, the search process is guided by a tight feedback loop. In the current art, database queries are delimited through a set of key words or expressions, and the result is displayed as an ordered list of documents that contain the set of keywords or expressions. The documents are ordered by relevance, where relevance is defined algorithmically as a match between the query terms and the frequency and distribution of those terms, or semantic associations of those terms, in the documents. Modifying the query will result in a reordered list. Examples of modifications are specifying different degrees of relevance of the terms, deleting some terms, introducing new terms, and indicating which terms should be close to one. The current art for describing these modifications includes Boolean strings, binary relevance operators (e.g., + or −), checklists, and graphical techniques for inserting or deleting terms. Often a query will return a large set of documents and it is difficult to determine algorithmically the appropriate relevance weightings that fit the needs of the user. In contrast, the present invention provides a novel method for rearranging the query result. Using techniques developed for real-time graphical manipulation of animated figures, a graphical user interface may be used in accordance with the present invention to rearrange the query result. Each node in a graph represents a term in the query. One advantage provided by the present invention is that the nodes may be arbitrarily rearranged in a two dimensional, or simulated three dimensional, display. Thus, terms with no semantic association may be arranged near one another. Positioning a cursor in the display results in a unique ordering of the query result. Notably, the cursor need not be on a node or on the direct path between nodes. If the cursor is on a node, then the term associated with that node receives the strongest relevance weighting. As the cursor is repositioned between nodes, the distance between the cursor and each node (i.e., term) is used to calculate a new set of relevance weightings. Rearranging the graph creates new possible combinations of weights. Positioning the cursor within the graph defines a unique combination of weights. The position of the cursor may be moved within the graph, and each repositioning causes a new list to be displayed.

In its basic configuration, the user interface of the present invention consists of two windows, a display window and a target (controller) window. The target window displays a two dimensional arrangement of target points where each target represents a DISPLACEMENT of the object from some BASE STATE. As the user drags the pointer over the target window, the object is updated and redrawn in the display window. The state change in the object is determined by the proximity of the pointer to the various targets.

The user is allowed to arrange the targets as desired, thus defining the potential search or animation space. Each target has an area of influence which is used to determine (based on the mouse position) how much of that target's displacement is applied to the object. The WEIGHTING CALCULATION may use any arbitrary function, but is typically based on the distance between the pointer and the target. How the target displacements are defined or selected is defined by a preselected external interface or procedure.

The object's state is changed as follows: every time the pointer position changes, the object is first put into its default base state. Then, all the targets are applied to the object based on their weighting, which is calculated from the mouse position. Often, only a small number of targets will be close enough to the mouse to have any influence. The object ("PARAMETER OBJECT") may then either be directly displayed or its set of parameters and values may be applied to another "DISPLAY OBJECT" which the user sees. The following Lisp pseudo-code shows what happens every time the user moves the pointer:

```
(defun PROCESS-NEW-INPUT (window targets parameter-object
    display-object
pointer-x pointer-y)
        (goto-base-state parameter-object)
        (loop for target in targets
            for weighting = (compute-weighting target pointer-x
            pointer-y)
            do
            (add-displacement parameter-object (get-displacement
            target)
weighting))
    ;; update the DISPLAY-OBJECT from the
        PARAMETER-OBJECT (if they are
the same, this is a no-op)
        (apply-update parameter-object display-object)
            (redisplay window display-object parameter-object))
        (defun ADD-DISPLACEMENT (object displacement weighting)
            (loop for parameter in (get-parameters object)
                do
                (set-parameter-value object parameter
                    (+ (get-parameter-value object parameter)
                    (* weighting (get-displacement-values
                    displacement))))))
```

The OBJECT (or "PARAMETER OBJECT") is anything that may be represented or encoded by a sequence of properties and their associated numeric values. It is this object which is directly changed by the interface in the manner described in the algorithm.

A STATE is a given set of parameters and values associated with a particular object. So, for example, the state of a television set might be defined by the values for the current channel, contrast, brightness, color and tint. Or the state of a human body, for animation purposes, might be defined by the state of bone rotations around their respective joints. One set of angles may define a "throw" pose and another may define a "crouch" pose.

The DISPLAY OBJECT is the object that the user sees in the display window. The DISPLAY OBJECT potentially may be different from the parameter object. The translation from the parameter object to the display object may be arbitrarily complex. For example, if the parameter object represents various parameters used in a physical simulation (gravity, wind velocity, friction, etc.), those parameters will be applied in the simulated environment, and the simulated environment will be redisplayed. On the other hand, often the parameter object may be displayed directly itself. For example, a human animation skeleton may serve both as a displayable structure and as a container for the various parameters and values that define the different body pose states.

The BASE STATE of an object is a default state that is used as a reference to save displacements (see below).

A DISPLACEMENT is the difference between two states of an object. Typically, a DISPLACEMENT is the difference between a desired target state and the base state.

The WEIGHTING CALCULATION is the function used to compute how much influence a given target has. One simple weighting calculation uses a radial falloff where each target represents the center of a circle. When the mouse is directly over the target (in the center of the circle), the full weight of that target's displacement is applied to the object. When the mouse is outside of the circle, the target has no effect on the object's state, and the weighting inside the circle is a number from 0.0 to 1.0, reflecting the pointer's distance from the center.

It is clear that not all possible states may be reached by this interface given a particular set and arrangement of targets. Thus, only those states that result from the linear combination of the defined target displacements, wherein the weightings are derived from the mouse position, may be achieved. The present invention provides a new user interface technique, system or method that may be applied to various domains.

The present invention provides a real-time interface for performer animation that enables a user to create various classes of targets with different behaviors, internal structure, and graphical representations wherein the animation includes some of the expressive power of scripted systems with natural input gestures and real-time control of interactive systems. In addition, target poses for performer animation may be combined into compound target poses and treated as one unit. Thus, the present invention provides the advantages of real-time animation with less complexity in providing development f expression and movement for target poses.

The present invention may be used to control body movement, dancing and facial expressions of a three dimensional character in an on-line shared music environment, chat room, interactive game or the like. The invention may also be applied to dynamically control sound synthesis.

FIG. 1 is a graphical representation of a 4-way split screen depiction of one embodiment of an implementation scheme on a computer screen in accordance with the present invention. In the upper left portion of FIG. 1, a wire-frame depiction of a head 102 is shown as a basic unit to be animated. The basic unit to be animated is selected by using a cursor directed by a mouse, a mouse-directing post, touchpad or the like, to click on the desired geometry selection selected from the plurality of geometry selections shown on the geometry selection screen 104 indicated in the lower left portion of FIG. 1. Where desired, the user may select to have the wire frame covered with "skin" that may be shaded in various sections. However, it should be noted that selection of the skin-covered version of the head requires more memory than the wire-frame version of the head, so that, depending on the computer's computational capacity, the skin-covered version of the head may move at a slower rate than the wire-frame version of the head. Typically, for example, a 450 MHz computer with a Pentium processor may implement the present invention.

After selecting the basic unit to be animated, at least one target screen is selected for the upper right portion. In the example shown in FIG. 1, target facial expressions of Fear 106, Surprise 108, Anger 110, Surprise Smile 112, Smile II 114 and Disgust 116 have been selected by clicking on the + button to show a pull-down screen with available facial expressions, thus providing a dot target or anchor on the screen for each selected facial expression, and then moving the dot target or anchor by mouse-clicking on the dot target or anchor and dragging the dot target or anchor to the desired position on the screen. The software programs listed on the pull-down screen for the facial expressions have been prepared previously. Typically, the cursor is placed on a dot target or anchor for a desired facial expression, and then the cursor is moved to a dot target or anchor for a next desired facial expression. The software for the selected facial expression interpolates the facial expression as the cursor is moved, animating the head to change from the facial expression for the first dot target or anchor to a next facial expression for the next dot target or anchor. Double-clicking and dragging the dot targets or anchors closer together, as shown in FIG. 1 when the dot target or anchor for Anger 110 is dragged to a position 118 close to the Surprise 108, provides for faster change in facial expression to the next facial expression when the cursor is moved from Anger 18 to Surprise 108 or, when the dot targets or anchors are superimposed, provides for combining the selected facial expressions. As shown in the lower right portion of FIG. 1, a layer may be added with camera poses. For example, camera pose 1 132 may represent viewing the character from a close-up perspective, and camera pose 2 134 may represent viewing the character from a distance.

In addition, other layers may be added, as, for example, when the facial expression is to be combined with motion. For example, where a wire-frame figure or skin-covered figure is used for a body to be animated, the geometry may be selected by mouse-clicking in the geometry selection area at the lower left of FIG. 1. A head may be added in the same manner, providing, for example, a character shown in FIG. 2A.

Figure 2A:
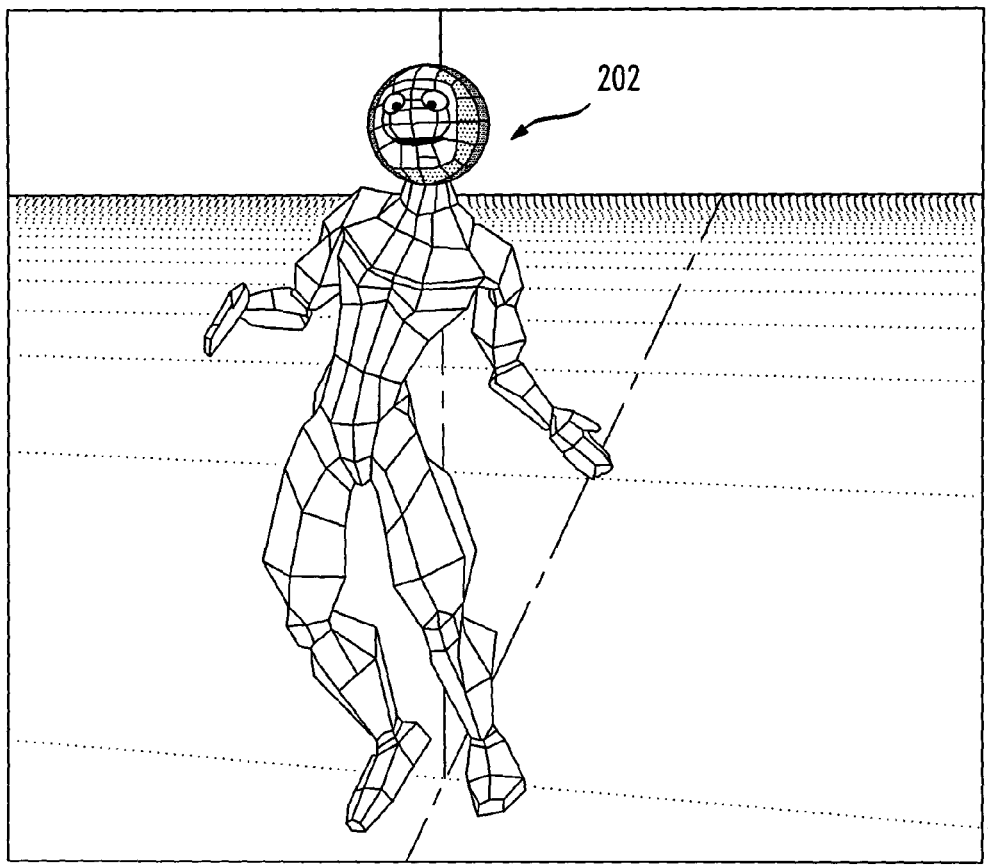
FIG. 2A is an illustration of a character in a dance pose based on clicking a mouse for a cursor very close to the sway-right target pose selection shown on the skeleton controller in FIG. 2B.
Figure 2B:
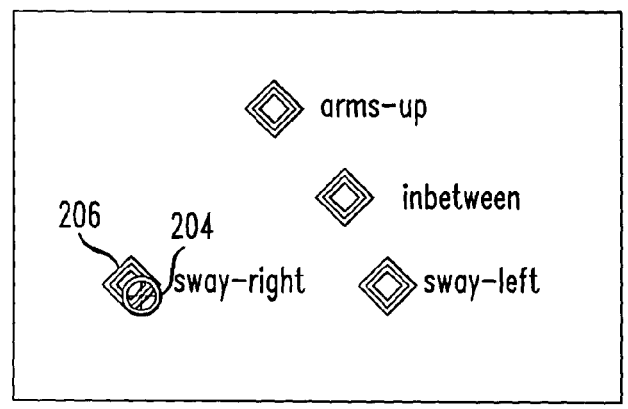

FIG. 2A is an illustration of a character 202 in a dance pose based on clicking a mouse for a cursor 204 very close to the sway-right 206 target pose selection shown on the skeleton controller in FIG. 2B. Two windows are utilized: a performer window and a target pose window, wherein the target pose window may have a plurality of layers. Each layer of the pose window shows available characteristics for a skeletal action, facial expression, or the like. For example, in the lower right portion of FIG. 1, target poses Arms Up 120, Arms Raised Halfway 122, Sway Left 124, Sway Right 126 are selected in a manner similar to the selection of facial expressions. Where desired, the target screen on the lower right portion of FIG. 1 may be selected and added to the target screen on the upper right portion of FIG. 1. When the cursor is dragged over the overlaid layers, the facial expression of the character, as well as his target pose, change in accordance with the position of the cursor relative to the target facial expressions and the target poses.

Figure 3A:
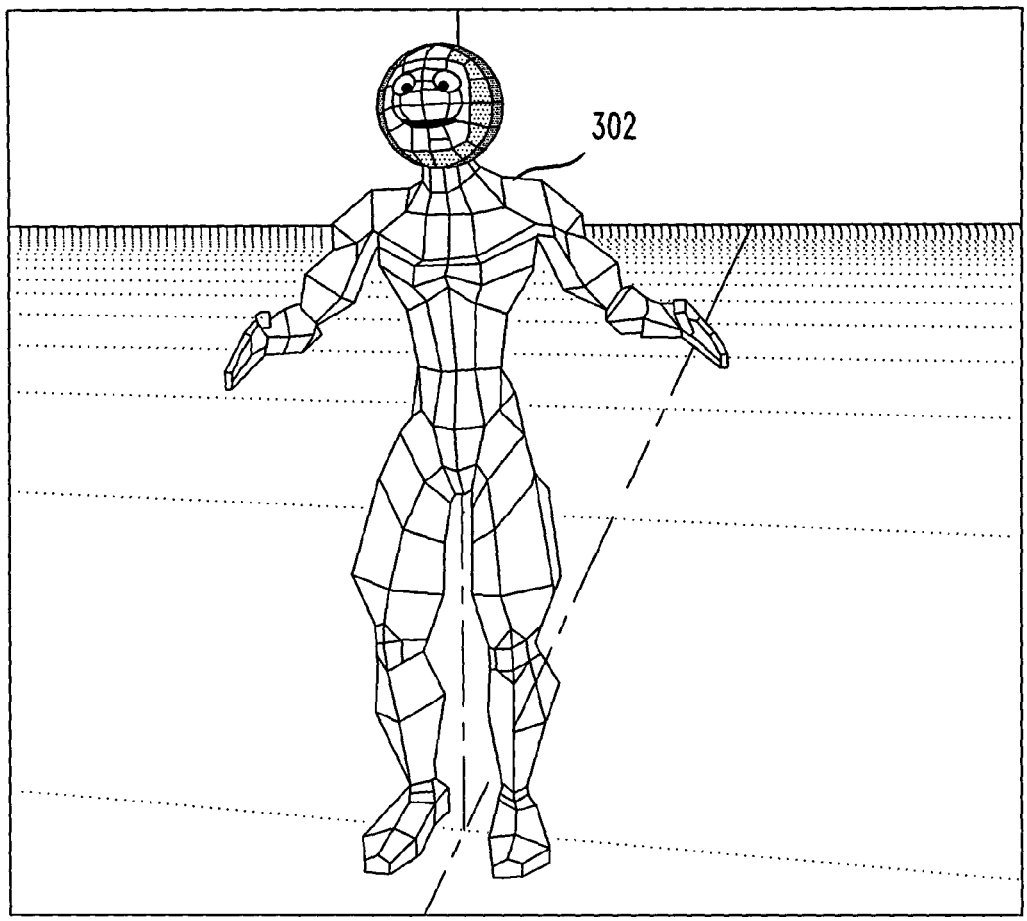
FIG. 3A is an illustration of a character in a dance pose based on clicking a mouse for a cursor approximately equidistant from the sway-right target pose selection and the sway-left target pose selection shown on the skeleton controller in FIG. 3B.
Figure 3B:
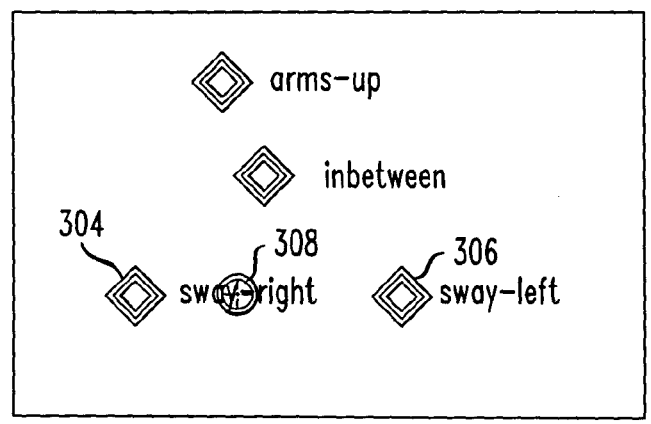

In addition, customized poses may be made, for example, by placing the cursor on each desired limb and dragging the limb to the desired position. The customized pose is then saved. FIG. 3A is an illustration of a character 302 in a dance pose based on clicking a mouse for a cursor 308 approximately equidistant from the sway-right 304 target pose selection and the sway-left 306 target pose selection shown on the skeleton controller in FIG. 3B. As the cursor is dragged from one target pose to a next target pose, geometrical x,y values representing the pose in the underlying software program are interpolated, and the screen shot illustrated shows a change in the pose from a swing-right pose toward a swing-left pose.

Figure 4A:
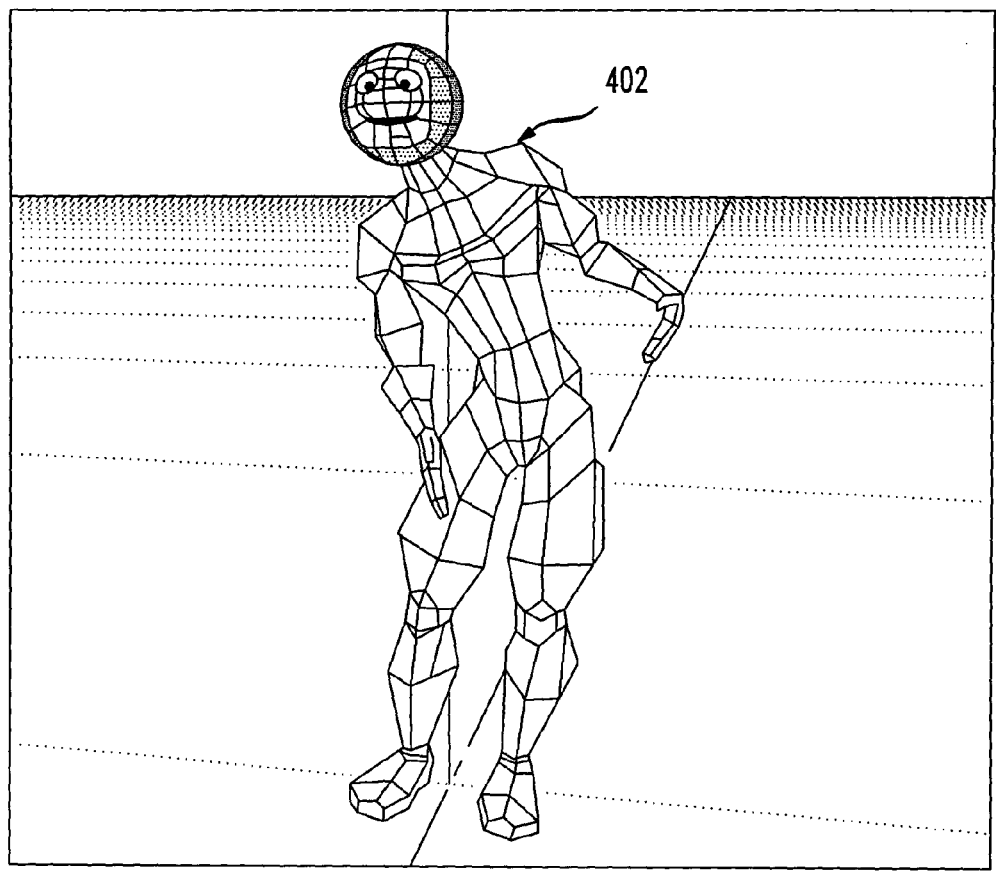
FIG. 4A is an illustration of a character in a dance pose based on clicking a mouse for a cursor very close to the sway-left target pose selection shown on the skeleton controller in FIG. 4B.
Figure 4B:
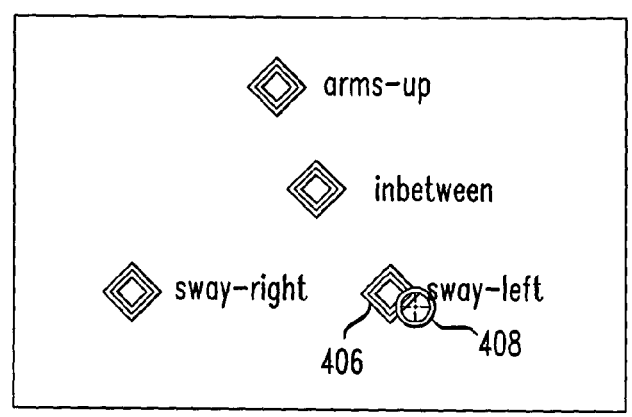
Figure 5A:
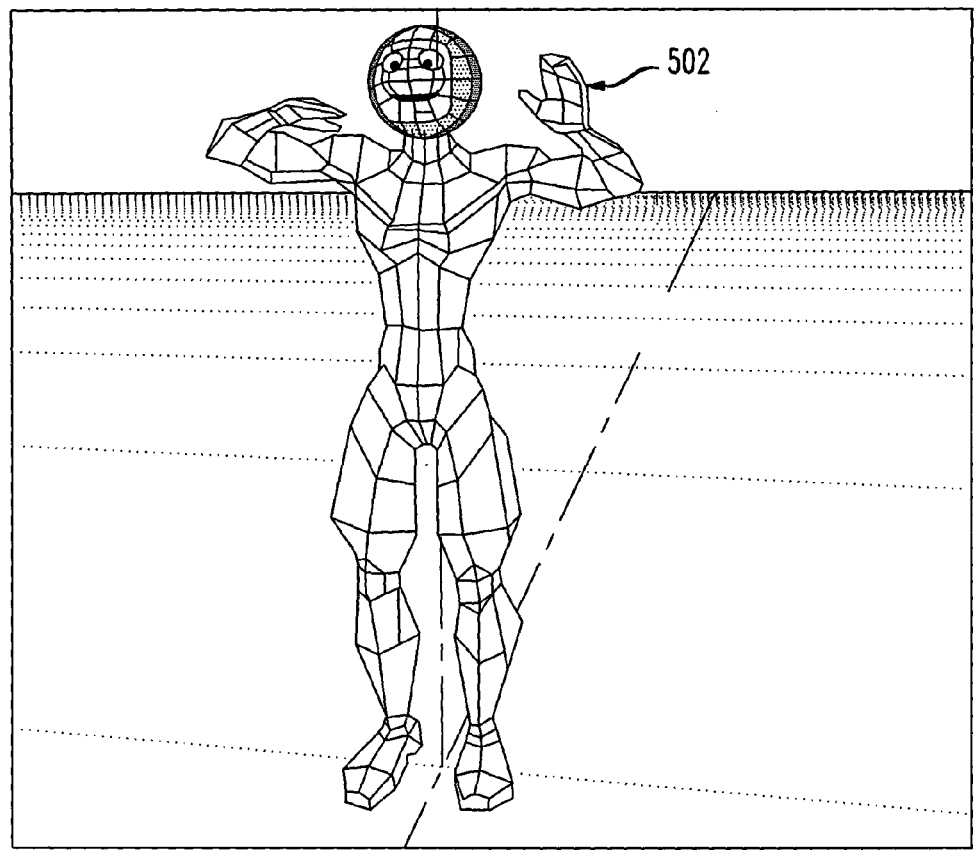
FIG. 5A is an illustration of a character in a dance pose based on clicking a mouse for a cursor approximately equidistant from the sway-right target pose selection, the in-between pose selection and the sway-left target pose selection shown on the skeleton controller in FIG. 5B.
Figure 5B:
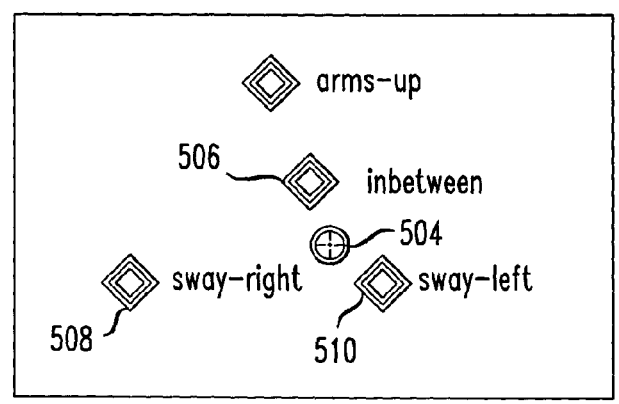

FIG. 4A is an illustration of a character 402 in a dance pose based on clicking a mouse for a cursor 408 very close to the sway-left 406 target pose selection shown on the skeleton controller in FIG. 4B. FIG. 5A is an illustration of a character 502 in a dance pose based on clicking a mouse for a cursor 504 approximately equidistant from the sway-right 508 target pose selection, the in-between 506 pose selection and the sway-left 510 target pose selection shown on the skeleton controller in FIG. 5B.

Figure 6A:
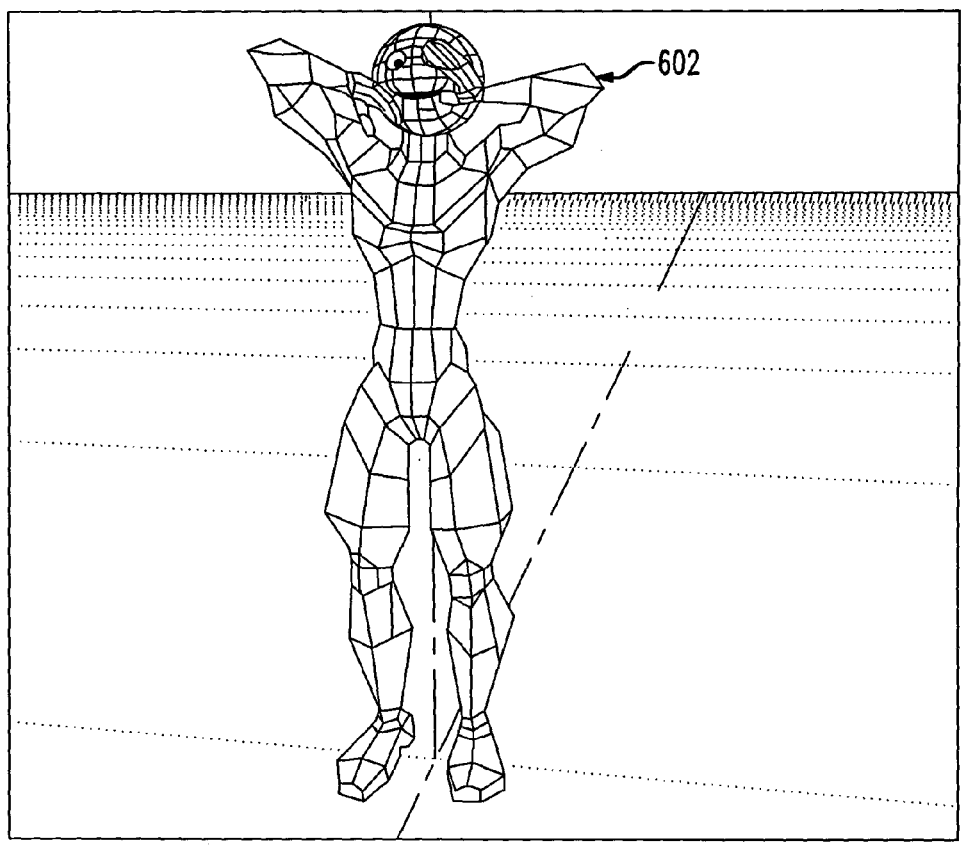
FIG. 6A is an illustration of a character in a dance pose based on clicking a mouse for a cursor very close to the in-between target pose selection shown on the skeleton controller in FIG. 6B.
Figure 6B:
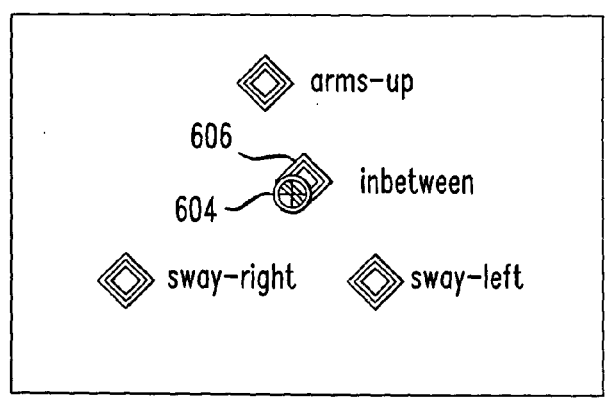

FIG. 6A is an illustration of a character 602 in a dance pose based on clicking a mouse for a cursor 604 very close to the in-between 606 target pose selection shown on the skeleton controller in FIG. 6B. Where desired, the cursor may be clicked on each limb of the character in the poses when the limb is to be moved, and the limb is dragged to the desired position.

Figure 7A:
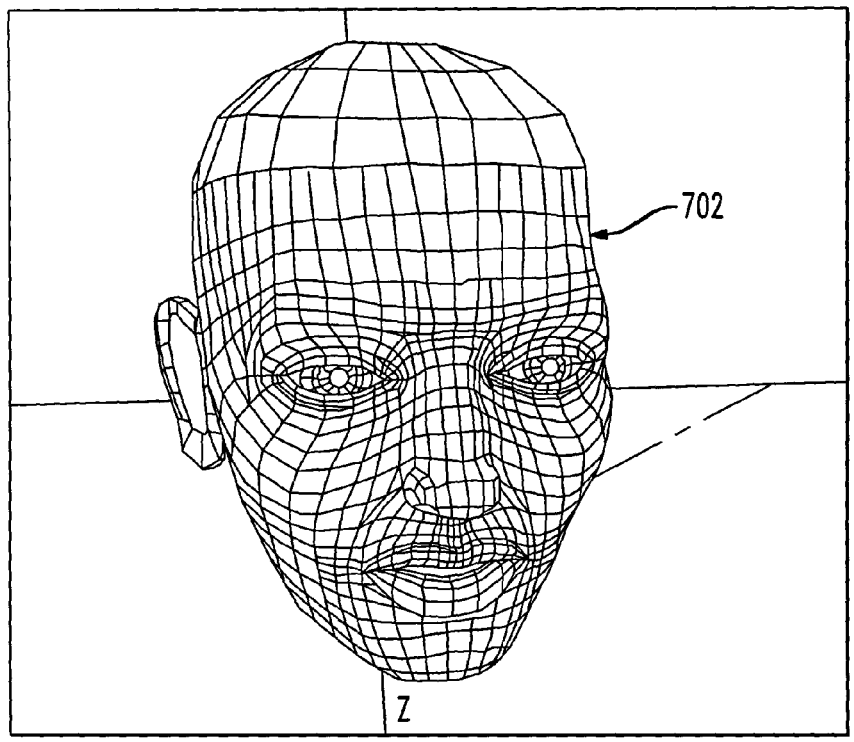
FIG. 7A is an illustration of a facial configuration based on clicking a mouse for a cursor in an area apart from the target selection shown on the facial controller in FIG. 7B.
Figure 7B:
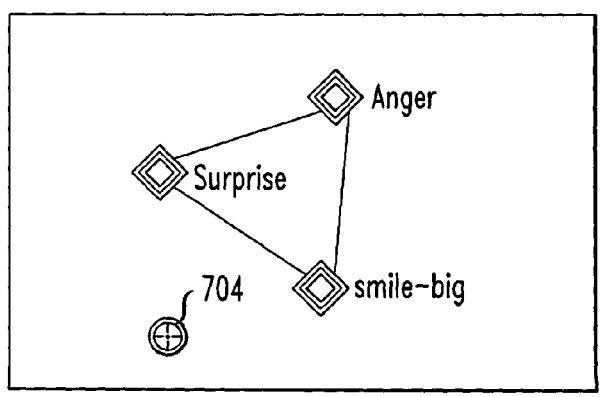
Figure 8A:
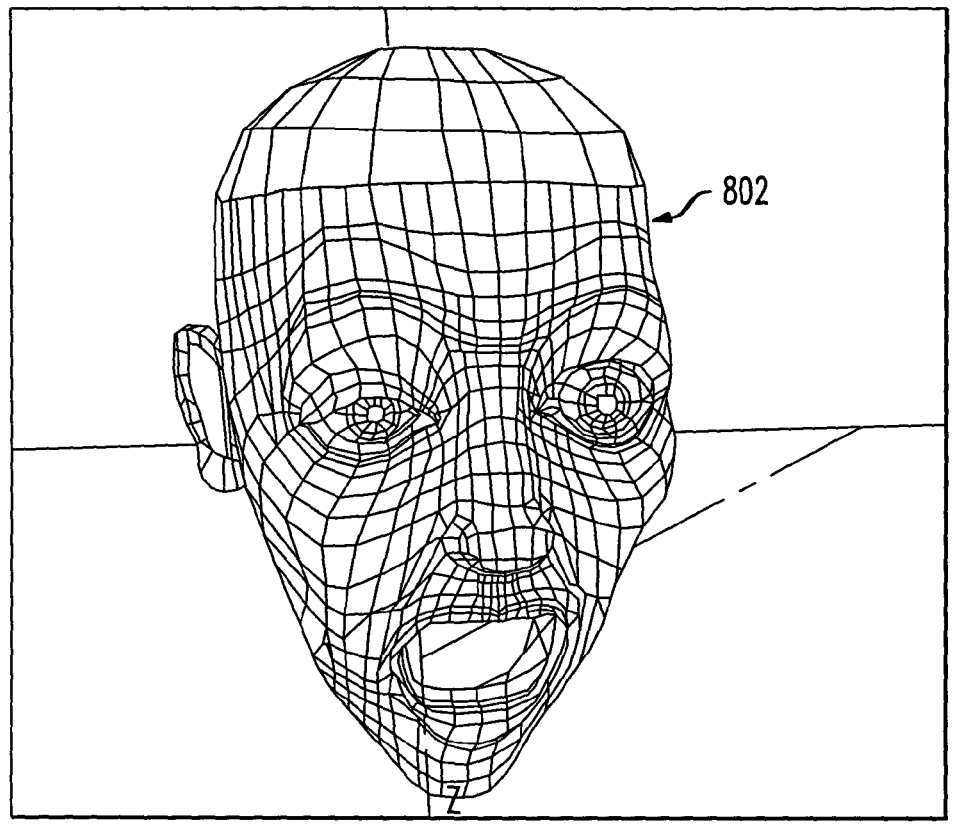
FIG. 8A is an illustration of a facial configuration based on clicking a mouse for a cursor in an area substantially on the surprise target selection shown on the facial controller in FIG. 8B.
Figure 8B:
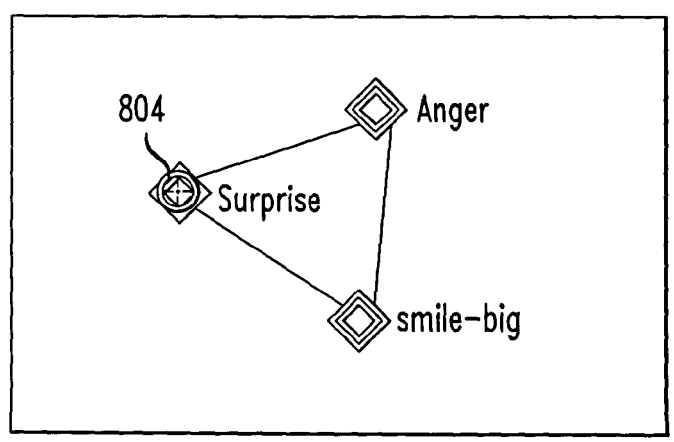
Figure 9A:
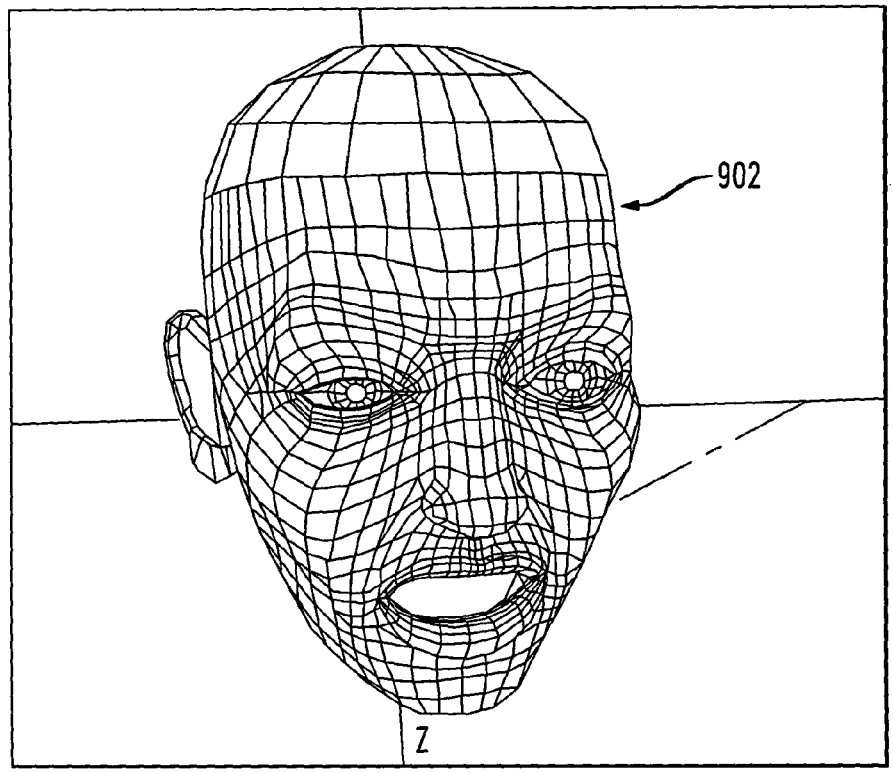
FIG. 9A is an illustration of a facial configuration based on clicking a mouse for a cursor in an area substantially halfway between the surprise target selection and the anger target selection shown on the facial controller in FIG. 9B.
Figure 9B:
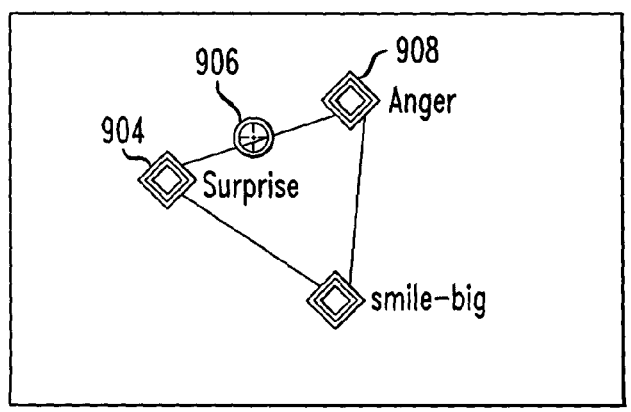
Figure 10A:
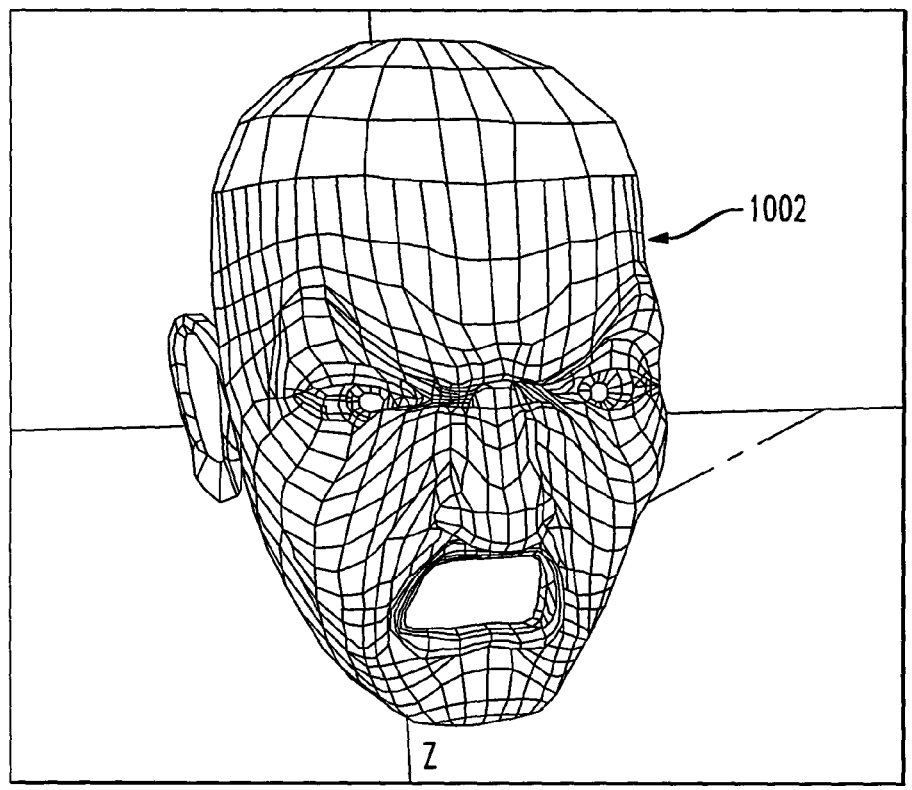
FIG. 10A is an illustration of a facial configuration based on clicking a mouse for a cursor in an area substantially on the anger target selection shown on the facial controller in FIG. 10B.
Figure 10B:
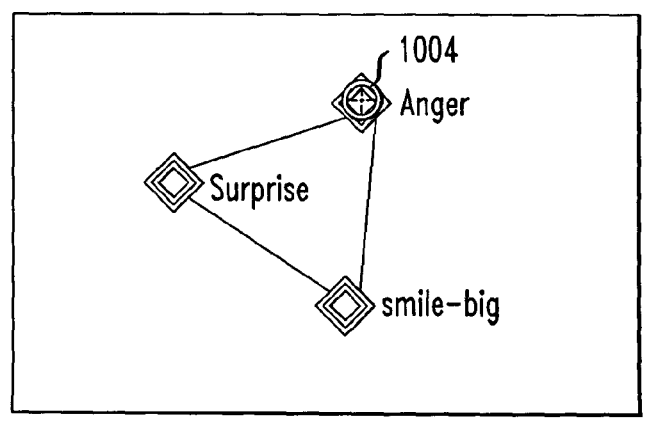
Figure 11A:
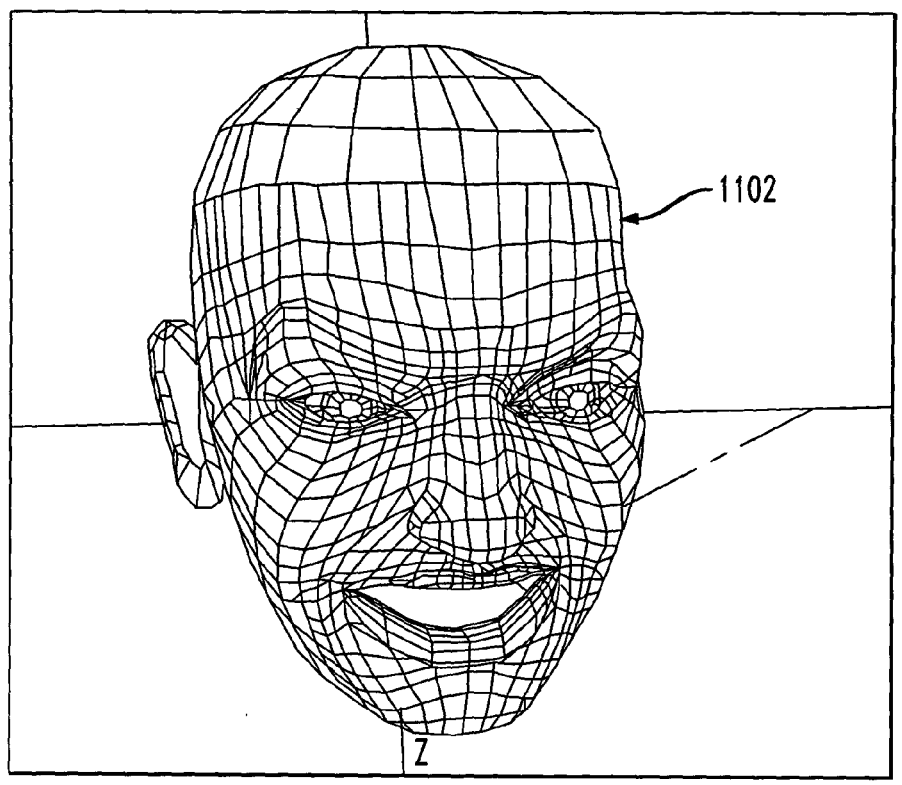
FIG. 11A is an illustration of a facial configuration based on clicking a mouse for a cursor in an area substantially halfway between the anger target selection and the smile-big target selection shown on the facial controller in FIG. 11B.
Figure 11B:
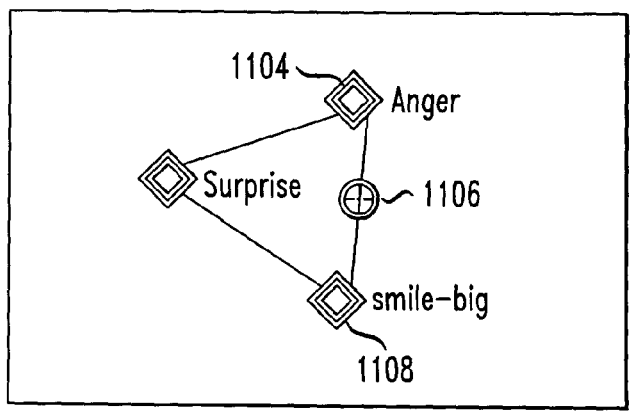
Figure 12A:
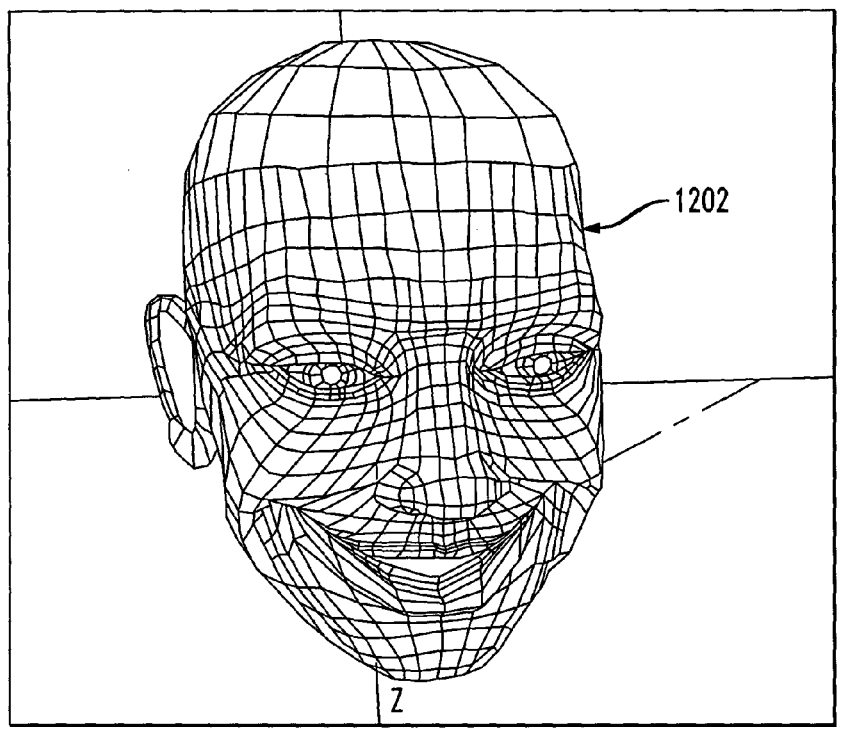
FIG. 12A is an illustration of a facial configuration based on clicking a mouse for a cursor in an area substantially on the smile-big target selection shown on the facial controller in FIG. 12B.
Figure 12B:
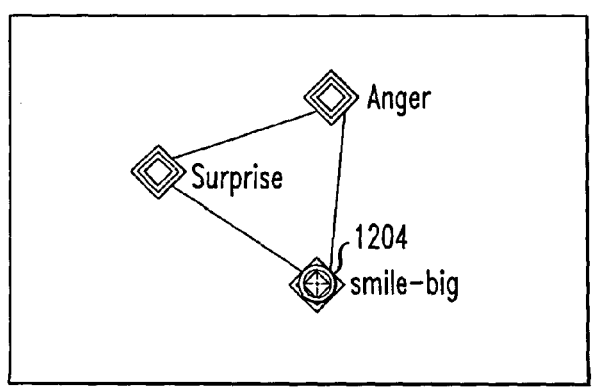
Figure 13A:
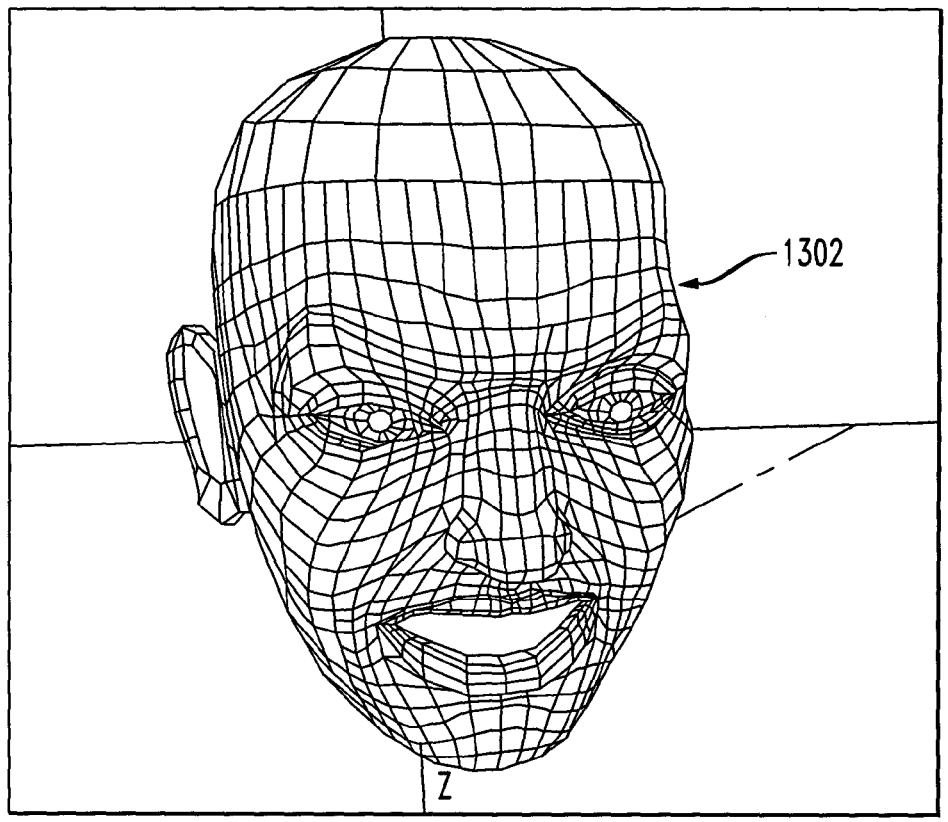
FIG. 13A is an illustration of a facial configuration based on clicking a mouse for a cursor in an area substantially equidistant between the anger target selection, the surprise target selection and the smile-big target selection shown on the facial controller in FIG. 13B.
Figure 13B:
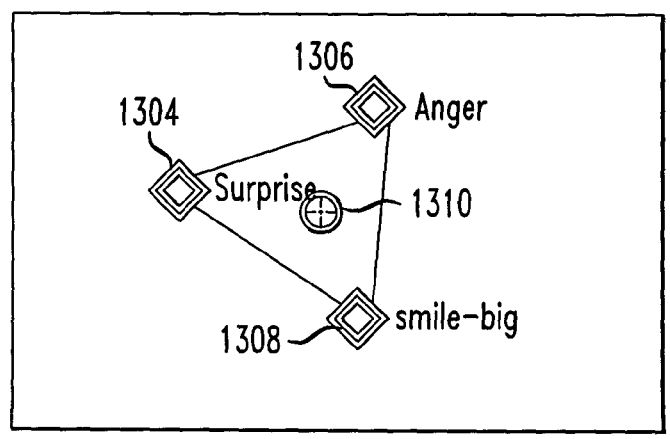

FIG. 7A is an illustration of a facial configuration 702 based on clicking a mouse for a cursor 704 in an area apart from the target selection shown on the facial controller in FIG. 7B. FIG. 8A is an illustration of a facial configuration 802 based on clicking a mouse for a cursor 804 in an area substantially on the surprise target selection shown on the facial controller in FIG. 8B. FIG. 9A is an illustration of a facial configuration 902 based on clicking a mouse for a cursor 906 in an area substantially halfway between the surprise target 904 selection and the anger target 908 selection shown on the facial controller in FIG. 9B. FIG. 10A is an illustration of a facial configuration 1002 based on clicking a mouse for a cursor 1004 in an area substantially on the anger target selection shown on the facial controller in FIG. 10B. FIG. 11A is an illustration of a facial configuration 1102 based on clicking a mouse for a cursor 1106 in an area substantially halfway between the anger target 1104 selection and the smile-big target 1108 selection shown on the facial controller in FIG. 11B. FIG. 12A is an illustration of a facial configuration 1202 based on clicking a mouse for a cursor 1204 in an area substantially on the smile-big target selection shown on the facial controller in FIG. 12B. FIG. 13A is an illustration of a facial configuration 1302 based on clicking a mouse for a cursor 1310 in an area substantially equidistant between the anger target 1306 selection, the surprise target 1304 selection and the smile-big target 1308 selection shown on the facial controller in FIG. 13B. Clearly, other facial expression selections may be utilized.

Sequential changes may be made to an arrangement of a plurality of boxes in accordance with the present invention. The boxes may, for example, be arranged in a circle, a line, a spiral, every third one located inward, every fifth one located inward, randomly, or as a vertical circle inside a horizontal circle. By dragging the cursor to the different dot targets or anchors, the arrangements are transformed from a first configuration to a second configuration. By adding a camera pose layer, the user may zoom in and out for the configurations.

Figure 14A:
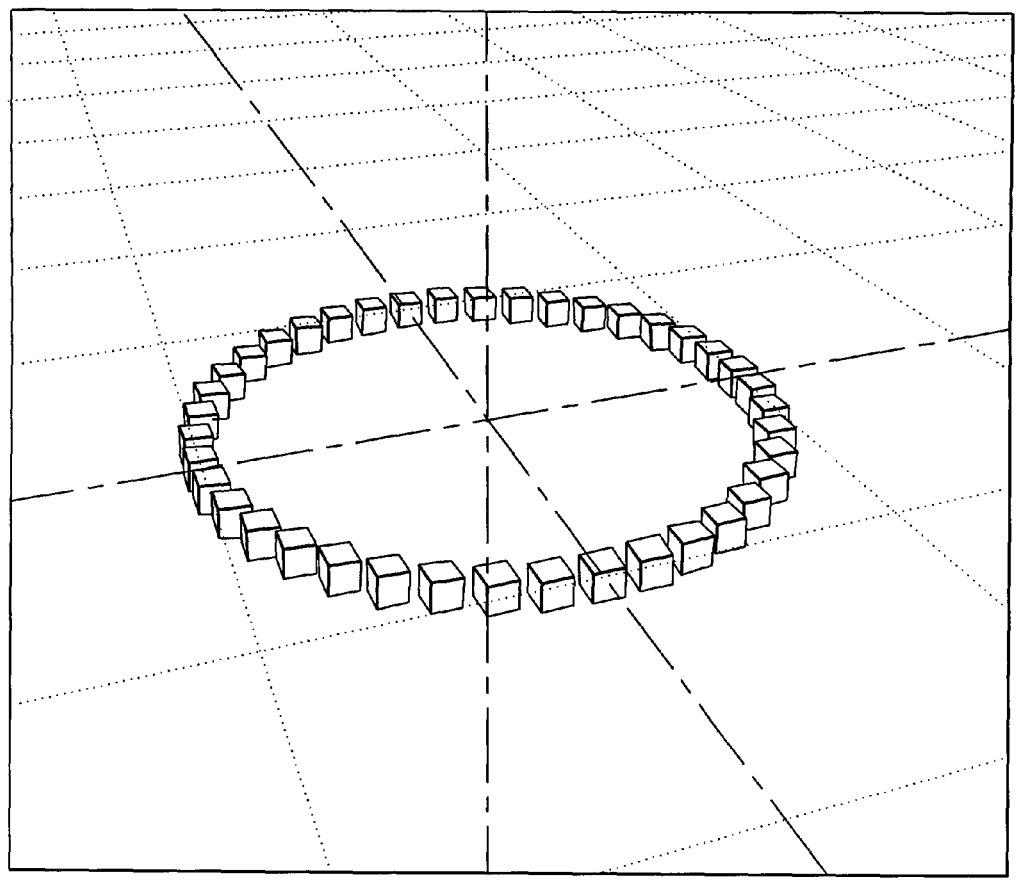
FIG. 14A is an illustration of a configuration of a series of blocks based on clicking a mouse for a cursor in an area apart from the target selection shown on the block controller in FIG. 14B.
Figure 14B:
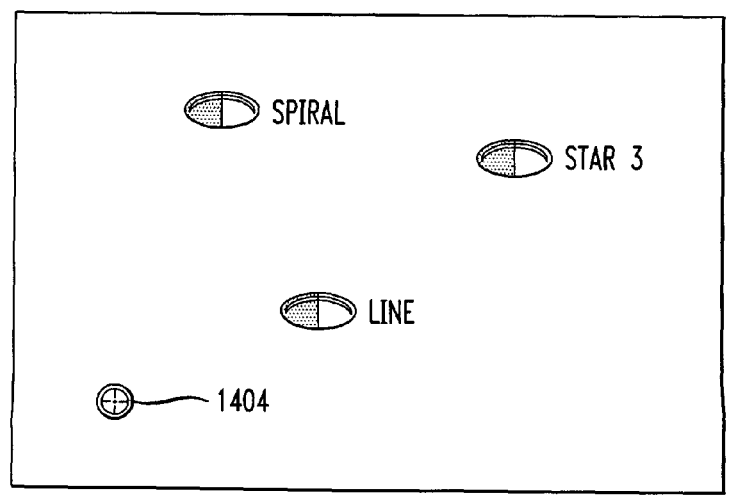
Figure 15A:
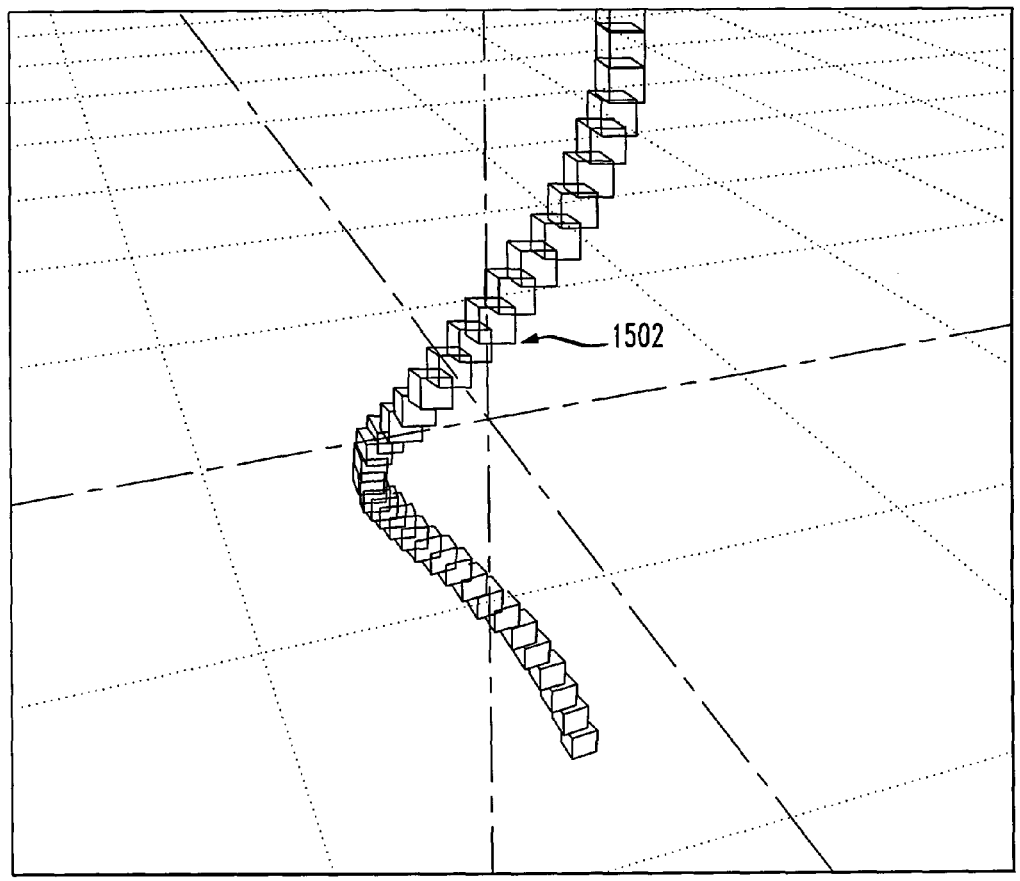
FIG. 15A is an illustration of a configuration of a series of blocks based on clicking a mouse for a cursor in an area approaching the line target selection shown on the block controller in FIG. 15B.
Figure 15B:
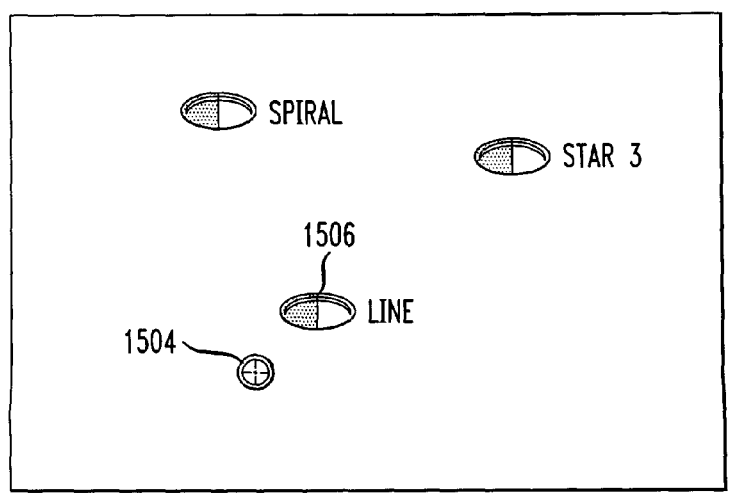
Figure 16A:
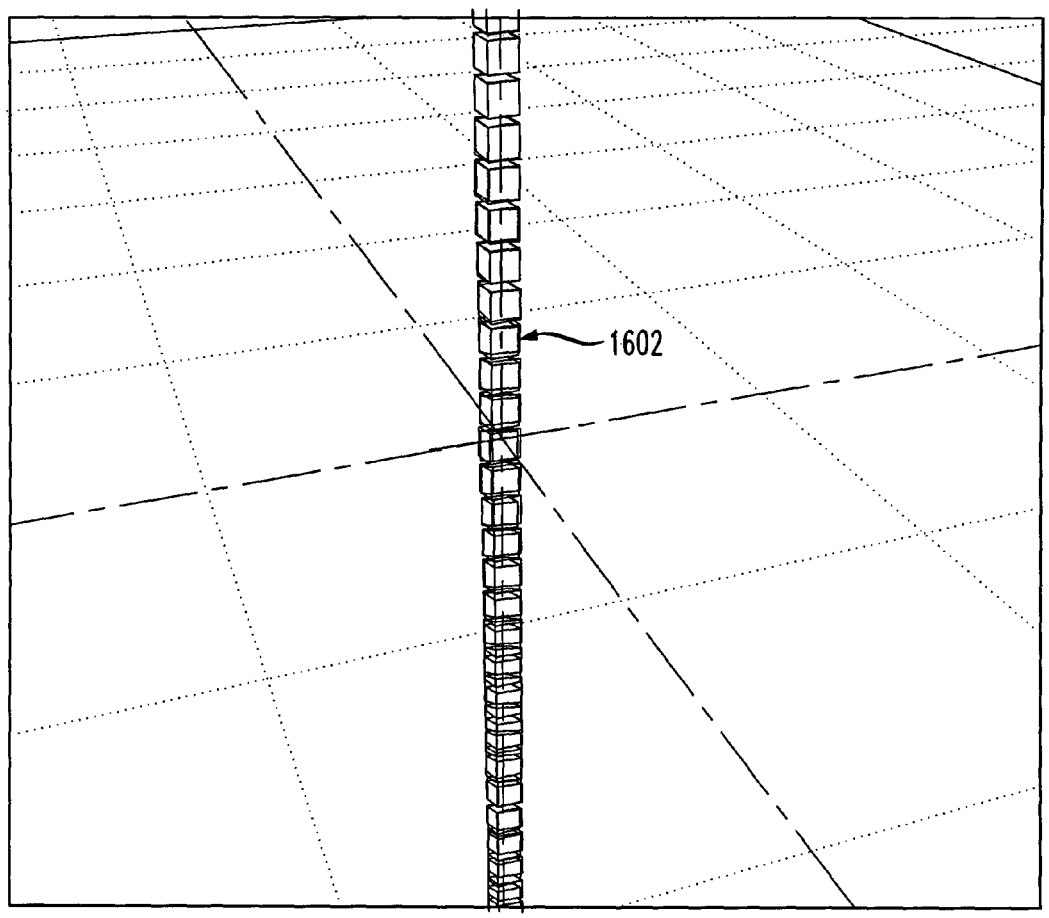
FIG. 16A is an illustration of a configuration of a series of blocks based on clicking a mouse for a cursor in an area substantially on the line target selection shown on the block controller in FIG. 16B.
Figure 16B:
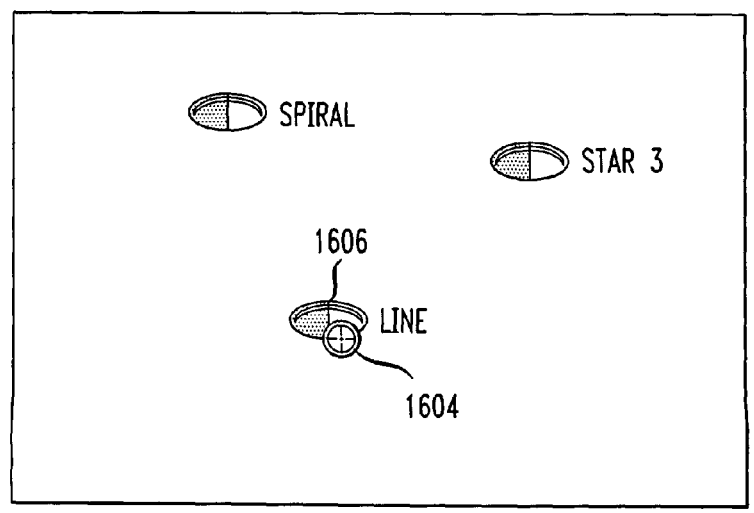
Figure 17A:
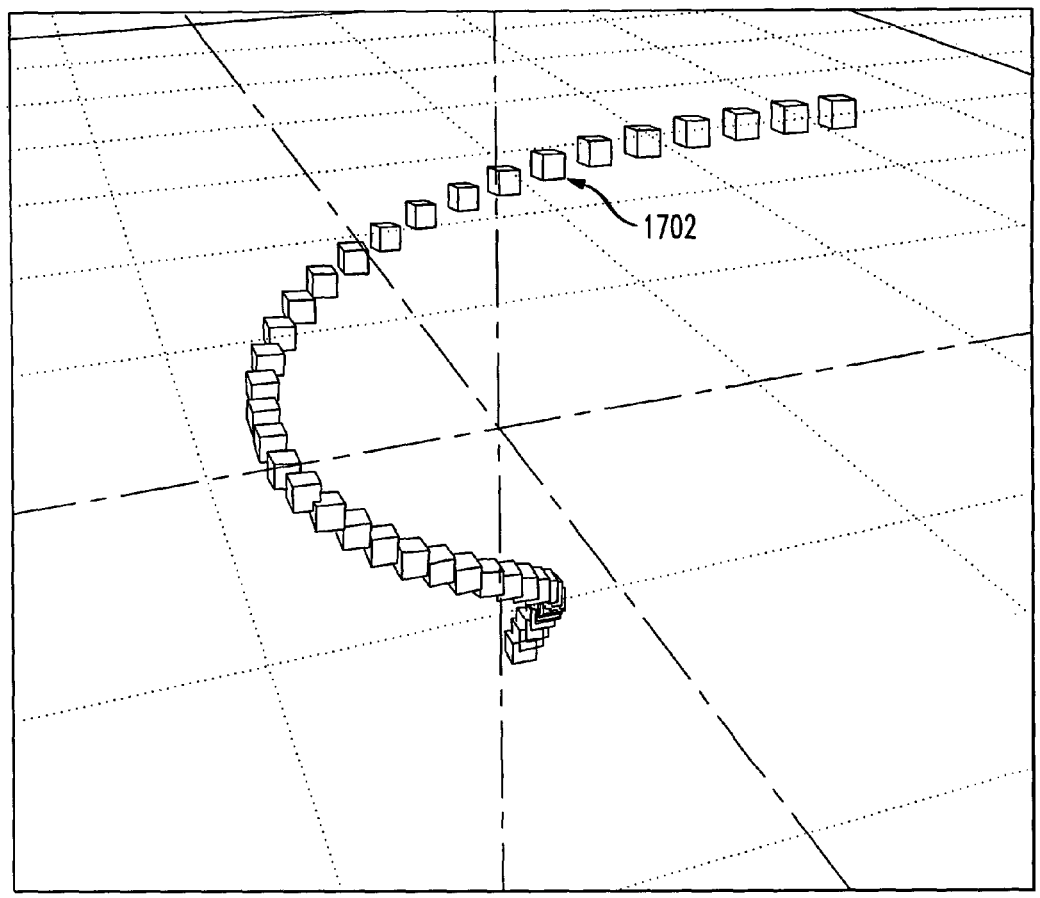
FIG. 17A is an illustration of a configuration of a series of blocks based on clicking a mouse for a cursor lying intermediate between the line target selection and the spiral target selection shown on the block controller in FIG. 17B.
Figure 17B:
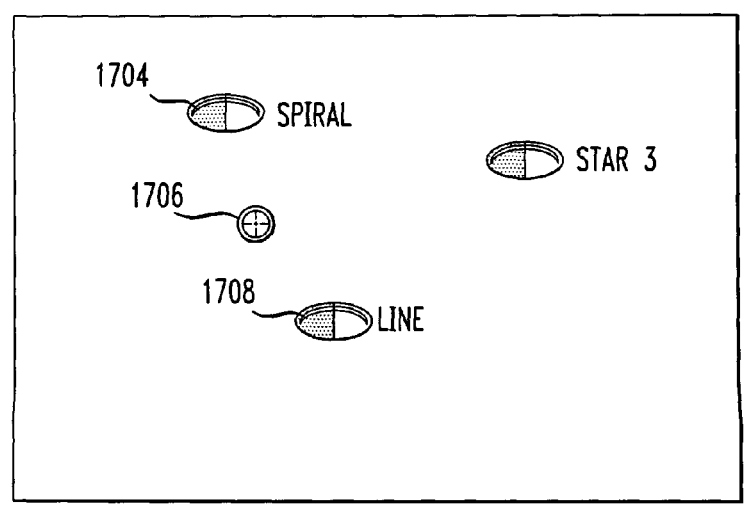
Figure 18A:
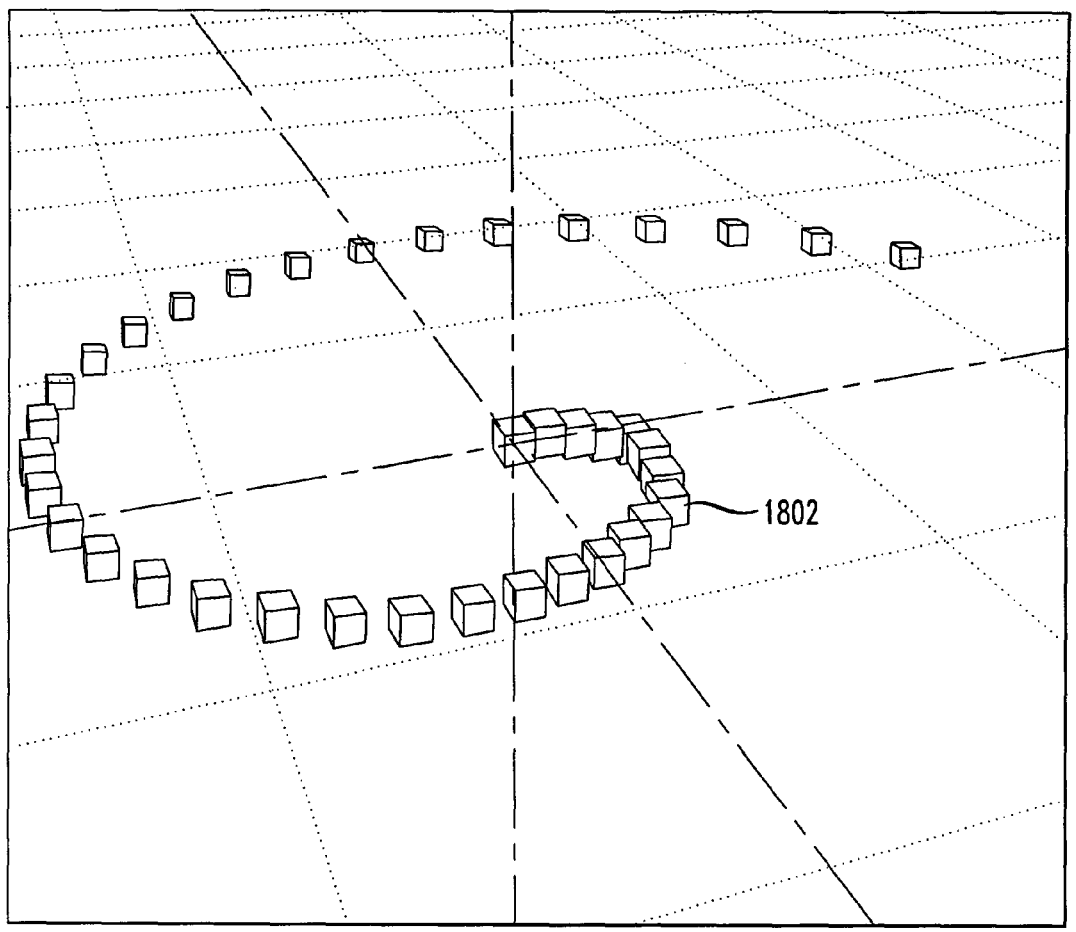
FIG. 18A is an illustration of a configuration of a series of blocks based on clicking a mouse for a cursor in an area substantially on the spiral target selection shown on the block controller in FIG. 18B.
Figure 18B:
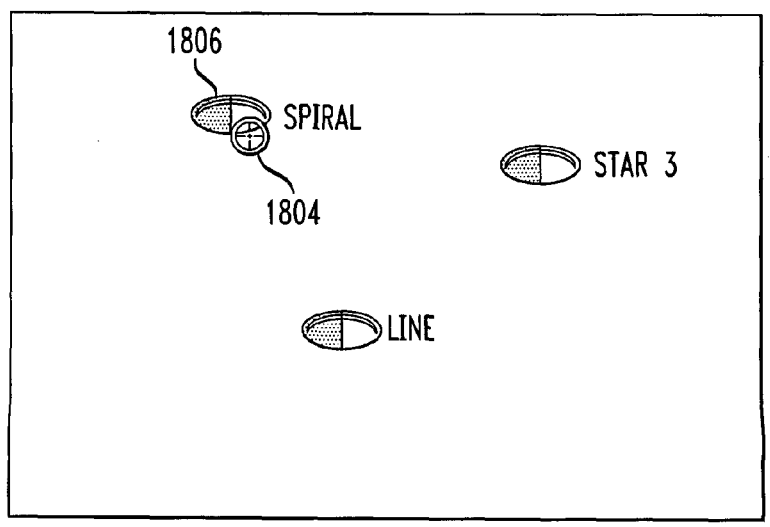
Figure 19A:
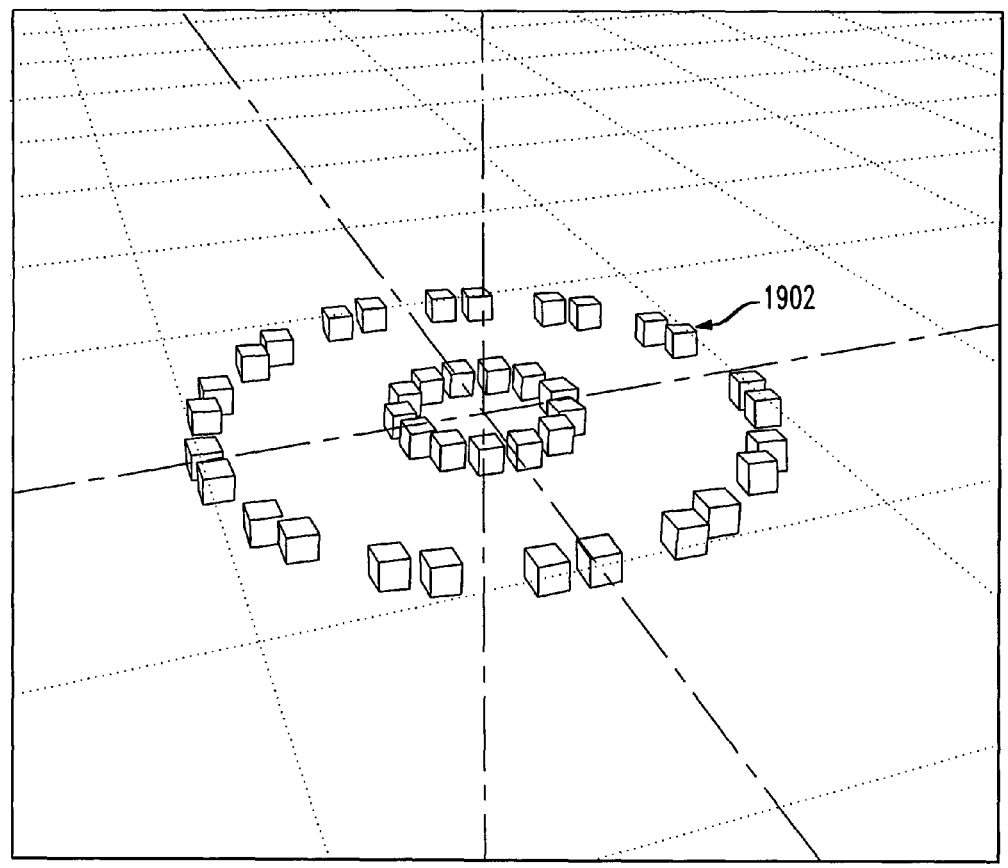
FIG. 19A is an illustration of a configuration of a series of blocks based on clicking a mouse for a cursor in an area substantially on the star 3 target selection shown on the block controller in FIG. 19B.
Figure 19B:
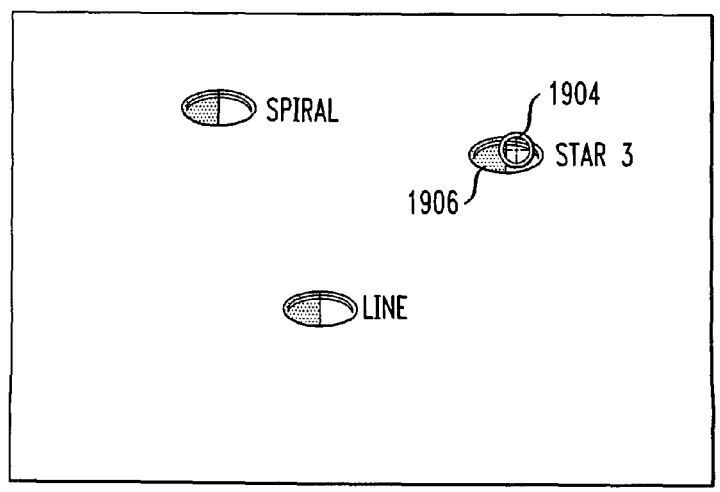
Figure 20A:
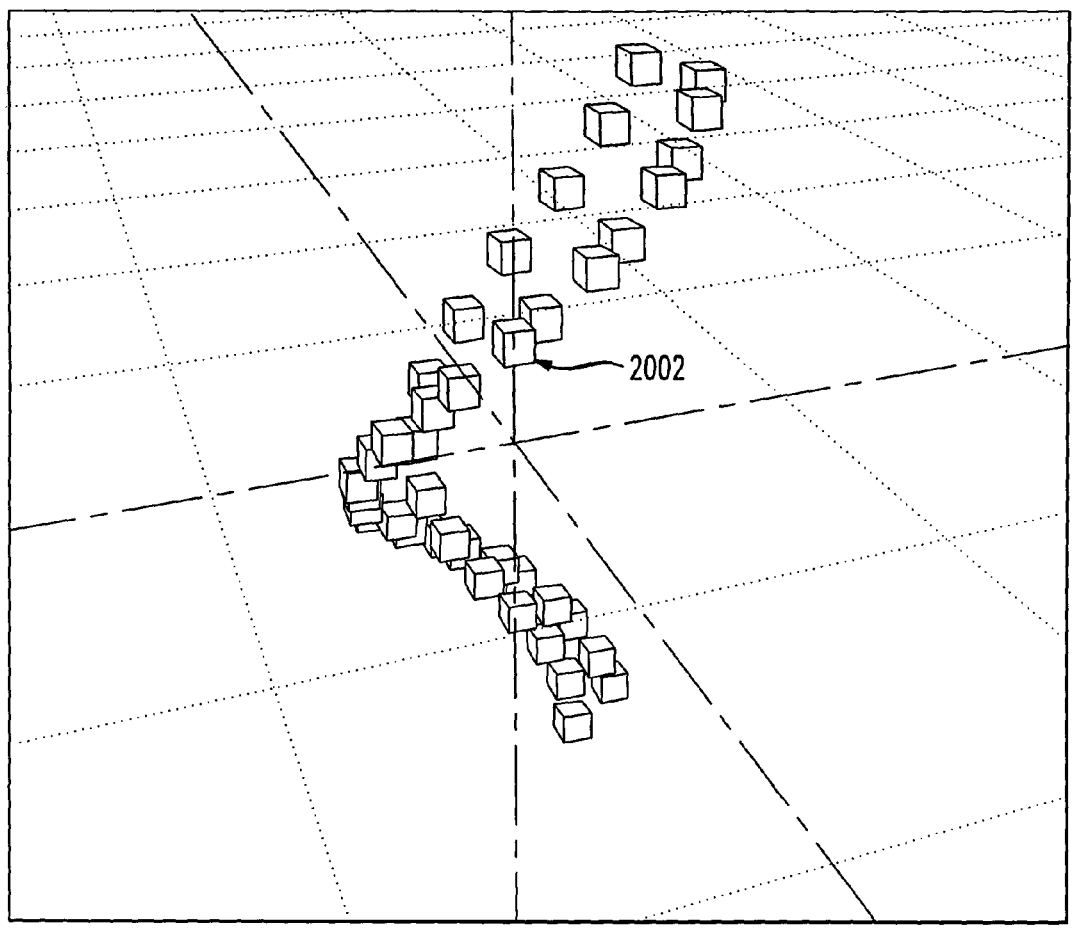
FIG. 20A is an illustration of a configuration of a series of blocks based on clicking a mouse for a cursor lying intermediate between the line target selection and the star 3 target selection shown on the block controller in FIG. 20B.
Figure 20B:
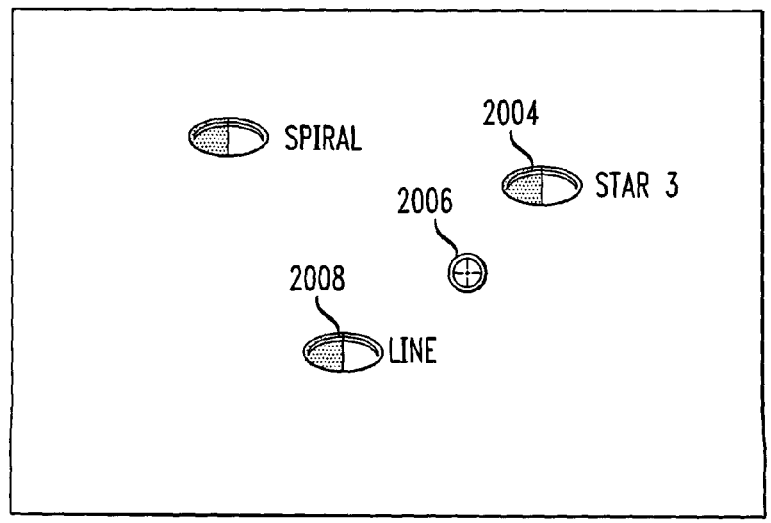
Figure 21A:
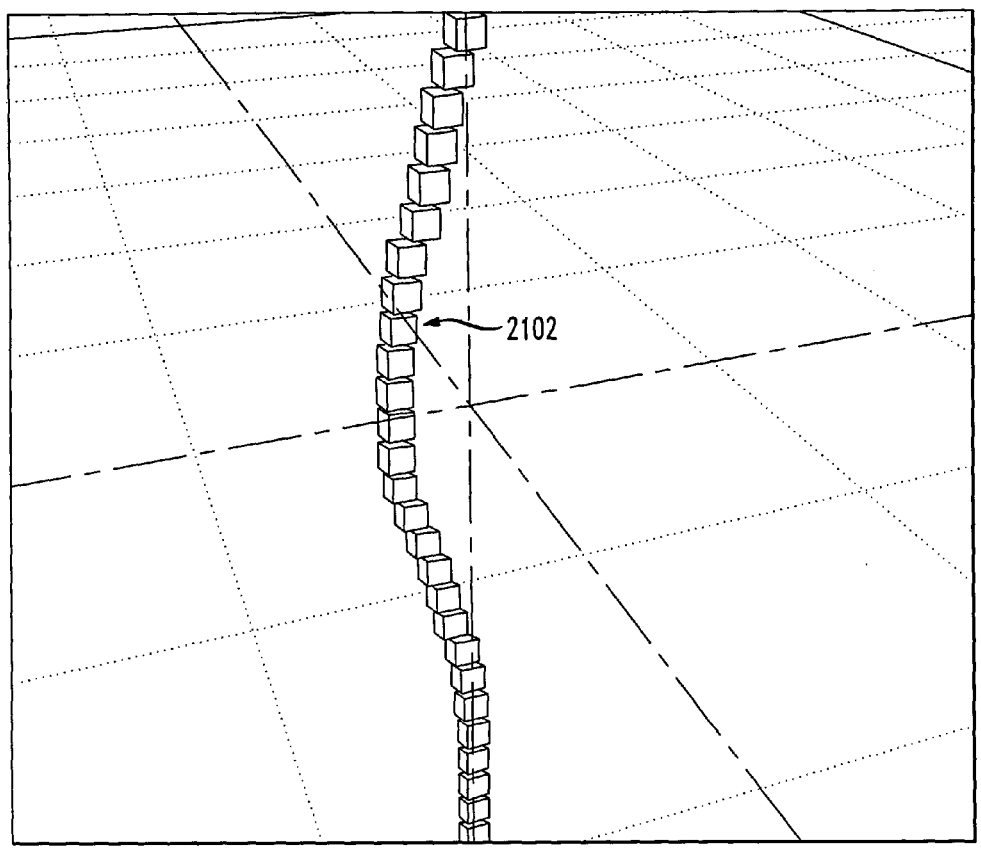
FIG. 21A is an illustration of a configuration of a series of blocks based on clicking a mouse for a cursor lying closer to the line target selection than to the star 3 target selection shown on the block controller in FIG. 21B.
Figure 21B:
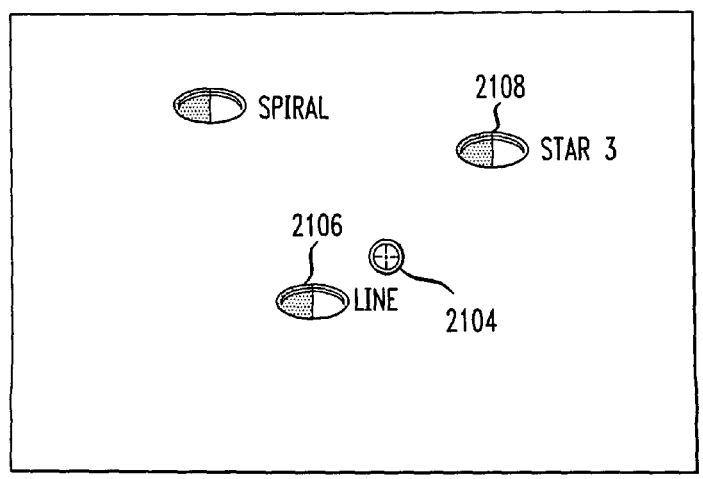

FIG. 14A is an illustration of a configuration of a series of blocks 1402 based on clicking a mouse for a cursor 1404 in an area apart from the target selection shown on the block controller in FIG. 14B. FIG. 15A is an illustration of a configuration of a series of blocks 1502 based on clicking a mouse for a cursor 1504 in an area approaching the line target 1506 selection shown on the block controller in FIG. 15B. FIG. 16A is an illustration of a configuration of a series of blocks 1602 based on clicking a mouse for a cursor 1604 in an area substantially on the line target 1606 selection shown on the block controller in FIG. 16B. FIG. 17A is an illustration of a configuration of a series of blocks 1702 based on clicking a mouse for a cursor 1706 lying intermediate between the line target 1708 selection and the spiral target 1704 selection shown on the block controller in FIG. 17B. FIG. 18A is an illustration of a configuration of a series of blocks 1802 based on clicking a mouse for a cursor 184 in an area substantially on the spiral target 1806 selection shown on the block controller in FIG. 18B. FIG. 19A is an illustration of a configuration of a series of blocks 1902 based on clicking a mouse for a cursor 1904 in an area substantially on the star 3 target 1906 selection shown on the block controller in FIG. 19B. FIG. 20A is an illustration of a configuration of a series of blocks 2002 based on clicking a mouse for a cursor 2006 lying intermediate between the line target 2008 selection and the star 3 target 2004 selection shown on the block controller in FIG. 20B. FIG. 21A is an illustration of a configuration of a series of blocks 2102 based on clicking a mouse for a cursor 2104 lying closer to the line target 2106 selection than to the star 3 target 2108 selection shown on the block controller in FIG. 21B.

Figure 22:
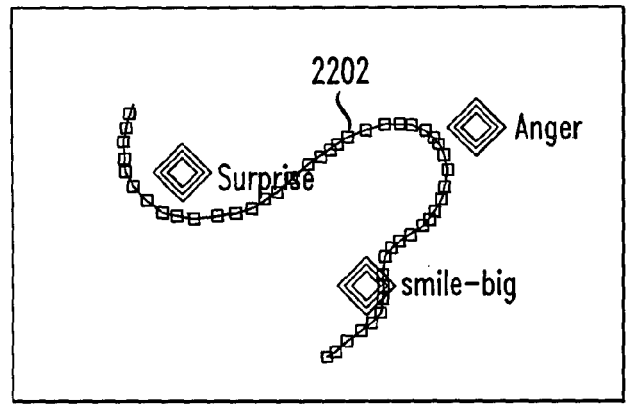
FIG. 22 is an illustration of a recording of a series of facial expressions utilized wherein the recording may be used to re-implement the series.

The user may insert facial and skeletal target poses in a performer window by dragging and dropping a selected pose from a palette of pre-defined target poses in the target pose window. To animate the character, the user drags the mouse over the target pose window. The target poses are additively applied to the character based on proximity to the cursor. Thus, for example, a smile may dynamically morph into a frown as the cursor moves between a smile target and a frown target, or one dance step may transition to another dance step. The exact layout of targets defines a graphical lexicon of input gestures with corresponding character motions. Various classes of targets may be created with different behaviors, internal structure, and graphical representations. In addition to the target poses on the palette, there may be other choices such as "Begin Recording", "End Recording", and "Play Recording". By selecting "Begin Recording", the cursor path is recorded, and is shown as a marked path on the computer screen. This recording may be viewed as a video clip by selecting "Play Recording" on the palette and clicking on the marked path. FIG. 22 is an illustration of a recording 2202 of a series of facial expressions utilized wherein the recording may be used to re-implement the series.

Figure 23:
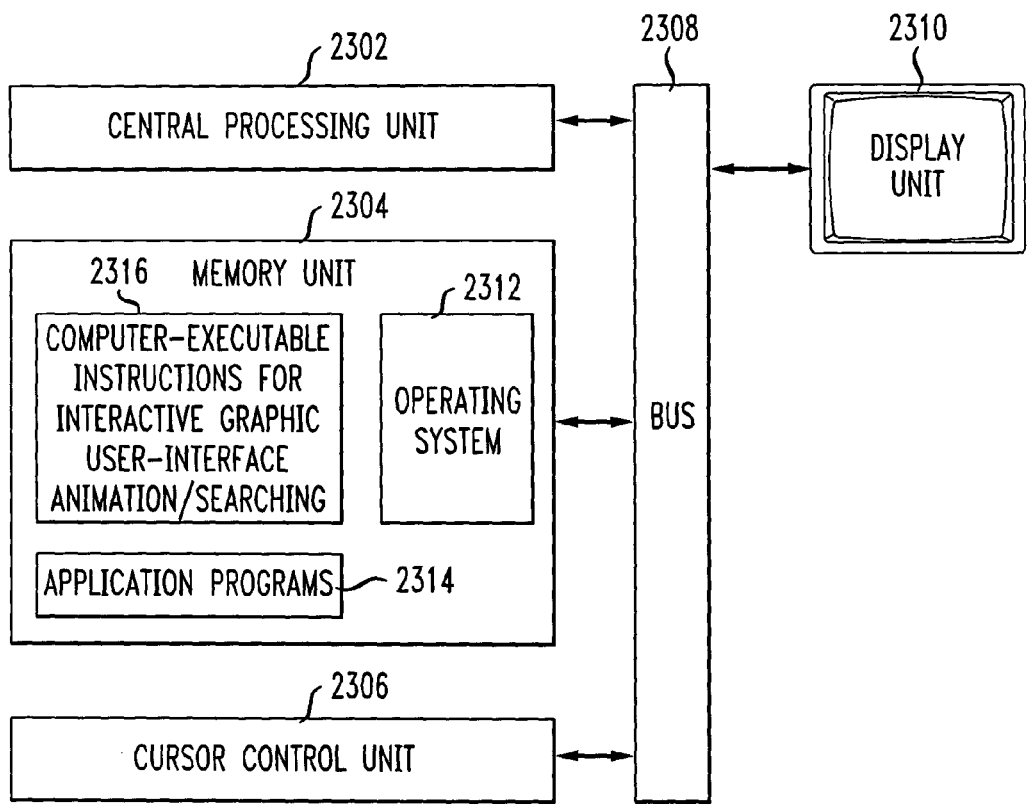
FIG. 23 illustrates one embodiment of a block diagram of an electronic display system operative to facilitate interactive, expressive animation by a user in accordance with the present invention.

The present invention may be implemented as an electronic display system, shown in one embodiment in block diagram form in FIG. 23, operative to facilitate interactive, expressive, three dimensional animation by a user. The electronic display system includes a central processing unit 2302, coupled to a system bus 808; a memory unit 2304 coupled to the system bus 2308 and having loaded therein an operating system 2312, application programs 2314 and computer-executable instructions for interactive graphic user-interface animation or searching 2316; a display unit 2310 coupled to the system bus 2308; a cursor control unit 2306 coupled to the system bus 2308; and the system bus 2308, for linking the central processing unit, the display unit, the memory unit, and the cursor control unit. In one embodiment, the computer-executable instructions for interactive graphic user-interface animation or searching 2316 may include: inserting a desired character, image, or query term onto a first window, which may be accomplished, for example, by selection from a palette in another window; inserting dot targets, anchors, or node terms onto a second window by, for each dot target, anchor, or node term, selecting a desired pose or selection from a plurality of predetermined poses, selections, or terms; and upon a cursor being dragged over the second window to a desired dot target, anchor, or node term, additively applying characteristics for the desired dot target, anchor, or node term to the desired character, image, or query term based on a proximity of the cursor to the desired dot target, anchor, or node term. The cursor control unit 806 may be a mouse, a moveable control peg in a keyboard, a touch-sensitive pad, or the like. The characteristics for the dot targets, anchors, or node terms are selectable for the use employed by the user. For example, for animation, characteristics may include facial expressions, character poses, or camera positions (for zooming in and out with respect to the view). The electronic display system may be implemented by a computer display system. Dot targets, anchors, or node terms may be combined by dragging a desired dot target, anchor, or node term onto at least one other dot target, anchor, or node term to form a compound dot target, anchor, or node term that has the characteristics of the combined dot targets, anchors or node terms. A palette may be generated by the computer-executable instructions and shown in a third window on the display unit. The palette may be used for selecting a desired character, image or query term to be inserted onto the first window.

Figure 24:
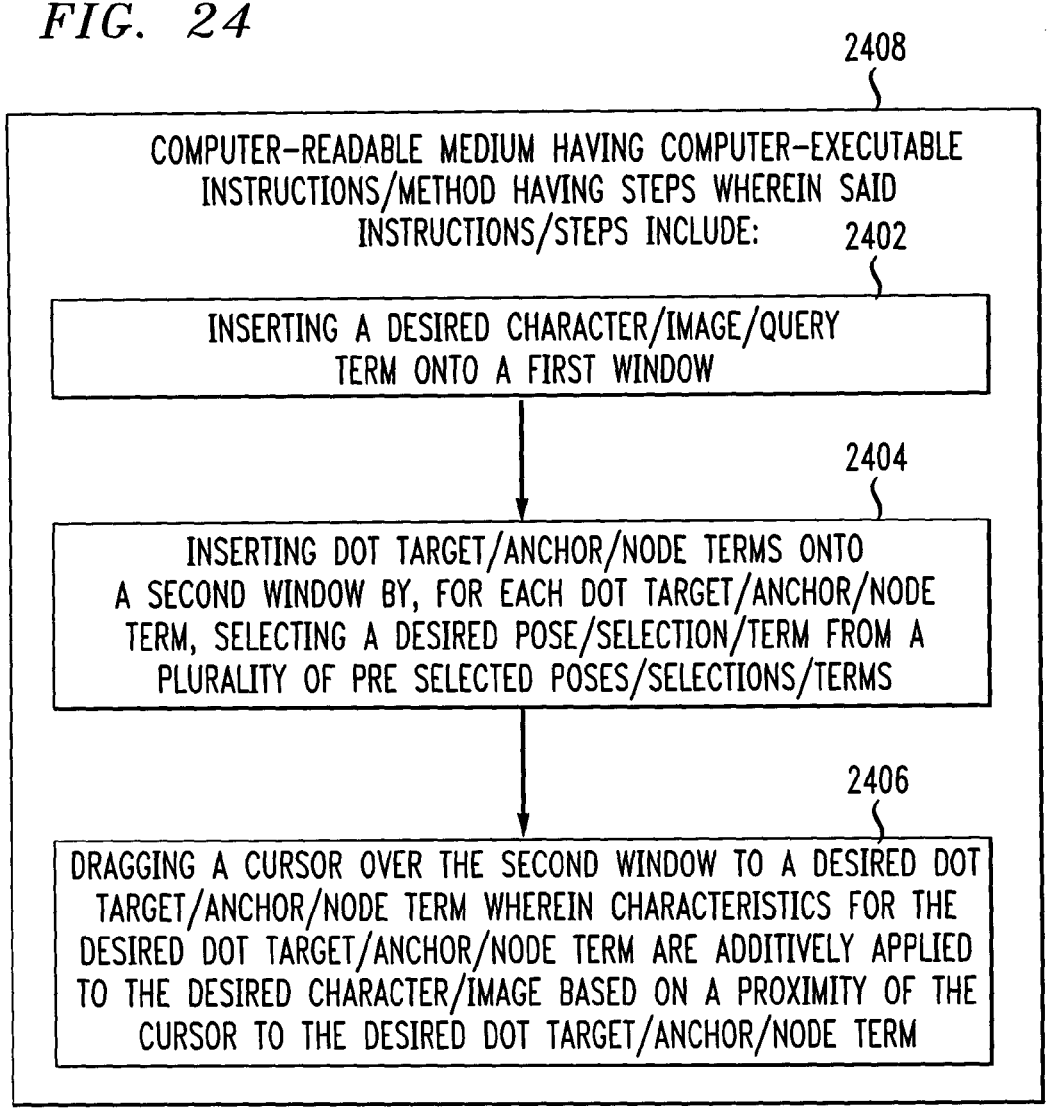
FIG. 24 shows one embodiment of steps for a method or computer-readable medium having computer-executable instructions for facilitating interactive, expressive, animation on an electronic display system by a user in accordance with the present invention.

FIG. 24 shows one embodiment of steps for a method or computer-executable instructions 2408 for facilitating interactive, expressive, three dimensional animation or searching on an electronic display system by a user in accordance with the present invention. The steps include: inserting 2402 a desired character, image, or query term onto a first window; inserting 2404 dot targets, anchors, node terms onto a second window by, for each dot target, anchor, or node term, selecting a desired pose, selection, or query term from a plurality of preselected poses, selections, or query terms; and dragging 2406 a cursor over the second window to a desired dot target, anchor, or query term wherein characteristics for the desired dot target, anchor, or node term are additively applied to the desired character, image, or query term based on a proximity of the cursor to the desired dot target, anchor, or node term. The characteristics are as described above. The electronic display system is typically a computer display system. Combinations of dot targets, anchors, or node terms are made by dragging one dot target, anchor, or node term onto at least one other dot target, anchor, or node term to get combined characteristics (interpolated). A palette may be used to select characters, images or query terms as described above.

Clearly, a computer-readable medium having computer-readable instructions 2408 may be used for implementing the present invention. The instructions provide for executing the steps of the method of the invention and are implemented in the fashion described above.

As shown in FIG. 25, the present invention may be implemented as a method or computer-readable medium 2502 having computer-executable instructions for facilitating animation or searching using a graphical user interface. The method or computer-readable medium include steps or computer-executable instructions that include: dragging 2504 a pointer over a two/three dimensional arrangement of a plurality of target points, anchors, or node terms in a target or controller window wherein each target, anchor or node term represents a displacement of a state of an object from a base state; and redrawing or updating 2506 the base state of the object in a display window in accordance with the proximity of the pointer to the target points, anchors or node terms as the pointer is dragged over the target window. Where desired, positions of the plurality of target points, anchors, or node terms in the target or controller window may be set by the user.

For example, the user may use the pointer to position the plurality of target points, anchors, or node terms, either individually or as a group. Typically, each target has a predetermined area of influence that is used to determine, based on a position of the pointer, the displacement to be applied to the object. The state of the object is generally redrawn or updated by putting an object into a default base state when a position of the pointer changes, then applying targets, anchors, or node terms to the object based on a weighting of each target, anchor, or node term, wherein the weighting is calculated based on the displacement of the pointer from the target, anchor, or node term. Each redrawing or updating of the base state of the object may be recorded to provide an animation path or search path which may be used to reproduce the series of redrawings or updatings. The animation path or search path is typically editable.

For example, pointing and clicking may be used to select and change or delete any portion of the animation or search path. Where desired, multiple targets, anchors or node terms with individual weightings may be applied simultaneously.

Current search engines use a variety of measures to algorithmically determine whether or not a document (or more generally an object) is relevant to a query. Common examples include statistical measures such as term frequency and the inverse document frequency of the term and its distribution across all documents in the database. Documents that are longer, more recent, more popular, more frequently linked to by other documents, and whose title or meta-tags contain some of the query terms are typically judged more relevant than documents lacking these characteristics. Various algorithms (often proprietary) are used to expand the query terms and weight and combine the relevance ranking factors. The present invention is independent of the particular factors.

What is important is that a set of factors and normative weights for each factor are defined.

TABLE 1

Example 1(33% 33% 33%): trust psychology web

1. Bulkley Book Rvw.html Relevance: 100%
2. High Trust ® Thinking/Leadership/Teaching & Trust Psychology ® Relevance: 100%
3. Why Christians Can't Trust Psychology Relevance: 100%
4. Why Christians Can't Trust Psychology Relevance: 100%
5. Recommended Reading: Psychology Relevance: 84%

Example 2 (50% 33% 17%): trust trust trust psychology psychology web

1. DEEP-ECOLOGY March 1997 discussion:: Eco-Psychology & Activism:
2. GIVING TO THE AMERICAN PSYCHOLOGICAL FOUNDATION Relevance: 100%
3. Healthcare Psychology Research Group Relevance: 100%
4. PSYCHOHERESY ABOUNDING Relevance: 100%
5. The Trust Advocate 800 Risk Management Program Relevance: 100%

Example 3 (50% 17% 33%): trust trust trust psychology web web

1. Moving WebWord: Gaining Users' Trust Relevance: 100%
2. CPA R. A. Burrell's Accounting Resource Guide Relevance: 100%
3. Legal Notices about This Web site Relevance: 100%
4. Web Security: A Matter of Trust, WWW Journal: Relevance: 100%
5. Awesome Web Solutions for Small Business -- THaNet Relevance: 100%

Example 4(17% 50% 33%): trust psychology psychology psychology web web

1. WEB Site for Psychology 101 Relevance: 100%
2. Psych Web list of Psychology Megalists Relevance: 100%
3. Community Psychology Awards Given to Web Sites Relevance: 100%
4. Selected Internet Resources for Psychology Relevance: 100%
5. Social Psychology Network Relevance: 100%

Example 5 (17% 33% 50%): trust psychology psychology web web web

1. Community Psychology Awards Given to Web Sites Relevance: 100%
2. Psychology Resources on the World Wide Web Relevance: 100%
3. WEB Site for Psychology 101 Relevance: 100%
4. Psych Web list of Psychology Megalists Relevance: 100%
5. About the Web Site Relevance: 100%

Current search engines allow limited control over the weights and factors used to determine relevance rankings. Search engines such as 'http://www.altavista.com' and many other popular engines allow terms to be prefixed with a "+" indicating that relevant documents must contain the term, and "–" indicating that relevant documents must not contain the query term. A few search engines such as 'http://www.infoseek.com' weigh repeated query terms more heavily than term used only once in a query. For example, as shown in Table 1 above, where listings were generated by infoseek by varying the occurrences of "trust", "psychology", and "web" in a query, it is clear that the query terms "trust", "psychology" and "web" retrieve different sets of document references depending upon how often each term is repeated. The query was intended to retrieve documents on the psychology underlying attributed trustworthiness of websites. As may be seen from examining Table 1, many of the retrieved references were not relevant to the search goal. Notably, in the examples shown in Table 1, the same number of document references was retrieved for each query. What differs is the relative rank assigned to each.

Figure 26A:
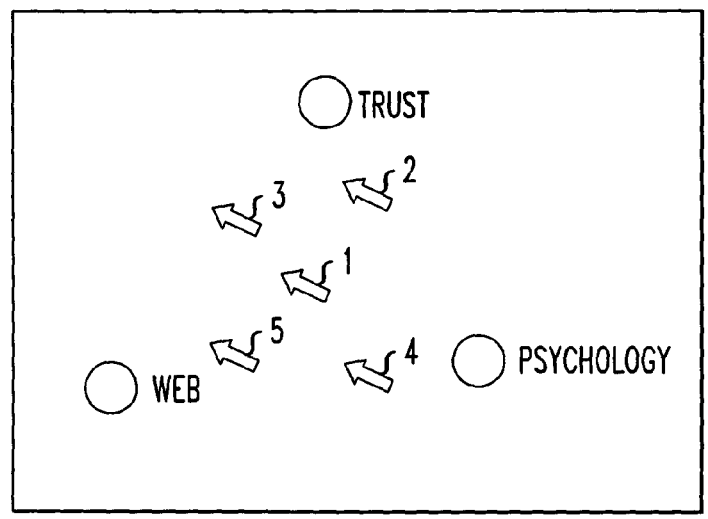
Figure 26B:
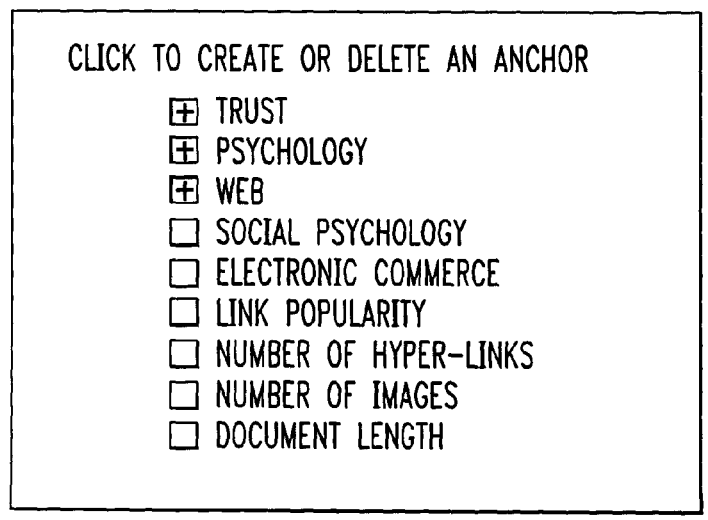

FIGS. 26A-26C illustrate one embodiment of a graphic user interface in accordance with the present invention. FIG.

26A shows a selection of anchor terms: "trust", "psychology" and "web". The numbered arrows indicate different cursor positions. The numbers of the arrows refer to the examples shown in Table 1. FIG. 26B shows a control screen for selecting or deleting anchor terms. FIG. 26C shows a display of a list of documents references and summaries generated for cursor position "2" in FIG. 26A. As shown in FIGS. 26A-26C, in the current invention the query terms, any terms in the expanded query (i.e., semantic cohorts of the original query), and other relevancy factors may be chosen as anchors in a visual display in accordance with the display properties described earlier for the animation system. The relative position of the anchors may be modified via drag-and-drop manipulations. The existence of an anchor may be manipulated by choosing the factor from a list of factors. Positioning the cursor within the display will determine how the anchors are weighted, which in turn will determine the relevance ranking of the documents. Notably, the anchors may be the type of relevance ranking factors mentioned above, or in a mega search engine, e.g., 'http://www.dogpile.com', the anchors may be various constituent search engines that are used by the mega search engine. The weight given to a particular domain or the inclusion of an audio or graphic image may also be used. The present invention is not limited to the preceding lists of factors but may accommodate any well-defined factor.

TABLE 2

| Document link | Doc. title | Doc. Summary | Last modified | Number of links referencing doc | Number of hyperlink in doc. |
|---|---|---|---|---|---|
| http://www.ap . . . | GIVING TO THE AMERICAN PSYCHOLOGICAL FOUNDATION | Description of the types of giving to the American Psychological Foundation. | 15 Apr. 1999 | 240 | 6 |

Table 2, shown above, is an illustration of a database generated in client memory to permit fast regeneration of a list of document references and summaries. Double-boxed cells are table column headers defining the content of each column. The second row of the table is an example of a row entry taken from the second entry of the web search results shown in FIG. 26C. The number of links in the last two columns represent arbitrary values selected for this example. As shown in Table 2 above, in the preferred arrangement, the search engine returns to the client not only the ten or so most relevant document references and summaries (where relevance is determined algorithmically) as is typically done, but also a database containing a much larger list of references (e.g., the top 1000 documents), summaries, and the unweighted vector of factors. This allows very fast recompilation and display of the "most relevant" document references.

The examples shown in Table 1 could be generated by moving a cursor appropriately between the anchors, "trust", "psychology" and "web". The other factors, e.g., document, recency, and popularity, would continue to affect the relevancy rankings as before. The cursor's movements would only affect the weights associated with the chosen anchors. In the preferred arrangement, the list of relevant document references and summaries is re-generated whenever the mouse button is released in a drag and drop manipulation.

By including or excluding various anchors and moving the anchors and the position of the cursor relative to these anchors, a user may explore the list of retrieved document references far more efficiently than moving to each 'next' screen of 10 references, or resubmitting the query with repetitions of some of the query terms.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A system that facilitates display of an interactive, expressive animation, the system comprising:
    a processor;
    a first module configured to control the processor to insert a desired image onto a first window based on input from a user;
    a second module configured to control the processor to insert an expression text anchor and a pose text anchor onto a second window by selecting a desired emotion from a plurality of preselected emotions for the expressions text anchor and selecting a desired pose from a plurality of preselected poses for the pose text anchor; and
    a third module configured to control the processor to receive input from the user to drag a cursor over the second window wherein characteristics of the desired emotion and the desired pose associated with the expression text anchor and the pose text anchor are additively applied to the desired image based on a proximity of the cursor to the expression text anchor and the pose text anchor.

2. The system of claim 1, wherein characteristics for the expression text anchor are at least one of:
    anger, surprise and happy.

3. The system of claim 1, wherein the second module further combines a plurality of text anchors to form a compound anchor.

4. The system of claim 1, wherein a palette in a third window displayed on a display unit of the system is used for selecting a desired image to be inserted onto the first window.

5. A system for facilitating animation using a graphics-based graphical user interface, the system comprising:
    a processor;
    a first module configured to control the processor to drag a pointer over an arrangement of an expression text anchor and a pose text anchor in a controller window, wherein the expression text anchor and the pose text anchor each represent a displacement of a state of a graphic-based object from a base state associated with the graphic-based object; and
    a second module configured to control the processor to update the base state of the object in a display window in accordance with the proximity of the pointer to the expression text anchor and the post text anchor as the pointer is dragged over the controller window.

6. The system of claim 5, wherein positions of the expression text anchor and the pose text anchor in the controller window are set by the user.

7. The system of claim 6, wherein the user uses the pointer to position the expression text anchor and the pose text anchor.

8. The system of claim 5, wherein each target has a predetermined area of influence that is used to determine, based on a position of the pointer, the displacement to be applied to the graphics-based object.

9. The system of claim 5, wherein the state of the object is updated by putting the graphics-based object into a default base state when a position of the pointer changes, then applying the expression text anchor and the pose text anchor to the object based on a weighting of each anchor, wherein the weighting is calculated based on the displacement of the pointer from the expression text anchor and the post text anchor.

10. The system of claim 5, wherein each updating of the base state of the graphics-based object is recorded to provide an animation path.

11. The system of claim 10, wherein the animation path is editable.

12. The system of claim 5, wherein multiple anchors with individual weightings are applied simultaneously.

\* \* \* \* \*